US011711350B2

(12) United States Patent
Barnett et al.

(10) Patent No.: US 11,711,350 B2
(45) Date of Patent: *Jul. 25, 2023

(54) SYSTEMS AND PROCESSES FOR VAULTLESS TOKENIZATION AND ENCRYPTION

(71) Applicant: Bluefin Payment Systems LLC, Atlanta, GA (US)

(72) Inventors: Timothy William Barnett, Roswell, GA (US); Grant Putre, Roswell, GA (US); Donal McCarthy, Waterford (IE)

(73) Assignee: Bluefin Payment Systems LLC, Atlanta, GA (US)

( * ) Notice: Subject to any disclaimer, the term of this patent is extended or adjusted under 35 U.S.C. 154(b) by 82 days.

This patent is subject to a terminal disclaimer.

(21) Appl. No.: 17/223,157

(22) Filed: Apr. 6, 2021

(65) Prior Publication Data

US 2021/0226934 A1    Jul. 22, 2021

Related U.S. Application Data

(63) Continuation-in-part of application No. 15/931,432, filed on May 13, 2020, now Pat. No. 11,070,534, and
(Continued)

(51) Int. Cl.
*H04L 9/40* (2022.01)
*G06F 21/62* (2013.01)

(52) U.S. Cl.
CPC ...... *H04L 63/0471* (2013.01); *G06F 21/6254* (2013.01); *H04L 63/0421* (2013.01)

(58) Field of Classification Search
CPC ............. H04L 63/0471; H04L 63/0421; G06F 21/6254
(Continued)

(56) References Cited

U.S. PATENT DOCUMENTS

| 4,926,475 A | 5/1990 | Spiotta et al. |
| 6,286,099 B1 | 9/2001 | Kramer |

(Continued)

FOREIGN PATENT DOCUMENTS

| CN | 102387501 A | 3/2012 |
| CN | 105024980 A | 11/2015 |

(Continued)

OTHER PUBLICATIONS

International Search Report and Written Opinion dated Apr. 13, 2015 for related PCT application No. PCT/US2015/10405.
(Continued)

*Primary Examiner* — Dereena T Cattungal
(74) *Attorney, Agent, or Firm* — Morris, Manning & Martin, LLP; Daniel E. Sineway, Esq.; Adam J. Thompson, Esq.

(57) ABSTRACT

A system for vaultless tokenization and encryption includes an iframe service for collecting data and a tokenization service for (de)tokenizing and encrypting/decrypting data. The system is accessible to users and partners that submit requests causing various functions to be executed by the system. The functions include, but are not limited to, providing (de)tokenization and/or encryption services, and managing and creating templates for iframe collection, (de)tokenization, and encryption/decryption. A template service facilitates generation of templates that parametrize collection of original data via served iframe elements, tokenization and/or encryption of original data, and detokenizing and/or decrypting tokens to recover original data. An iframe service
(Continued)

is configured for providing a virtual terminal, an iframe that provides users direct access to (de)tokenization and/or decryption/encryption services. Access to system services is managed via identifiers that include authentication credentials and parameters for performing (de)tokenization and/or encryption/decryption processes.

20 Claims, 5 Drawing Sheets

Related U.S. Application Data a continuation-in-part of application No. 15/997,205, filed on Jun. 4, 2018, now abandoned.

(60) Provisional application No. 62/847,010, filed on May 13, 2019, provisional application No. 62/514,324, filed on Jun. 2, 2017.

(58) Field of Classification Search
USPC .................................................. 713/153
See application file for complete search history.

(56) References Cited

U.S. PATENT DOCUMENTS

| | | | |
|---|---|---|---|
| 6,446,092 B1 | 9/2002 | Sutter | |
| 6,484,260 B1 | 11/2002 | Scott et al. | |
| 6,523,032 B1 | 2/2003 | Sunkara | |
| 6,934,664 B1 | 8/2005 | Webb et al. | |
| 7,028,014 B1 | 4/2006 | Naclerio | |
| 7,386,471 B1 | 6/2008 | Nack | |
| 7,546,465 B2 | 6/2009 | Kent, Jr. et al. | |
| 7,731,435 B2 | 6/2010 | Piersol et al. | |
| 7,941,673 B1 | 5/2011 | Trimberger | |
| 8,315,948 B2 | 11/2012 | Walker et al. | |
| 8,429,041 B2 | 4/2013 | Bonalle et al. | |
| 8,555,083 B1 | 10/2013 | Nanda et al. | |
| 8,788,428 B2 | 7/2014 | Weston et al. | |
| 9,280,765 B2 | 3/2016 | Hammad | |
| 9,355,374 B2 | 5/2016 | Barnett et al. | |
| 9,419,842 B1 | 8/2016 | Galliher, III et al. | |
| 9,942,043 B2 | 4/2018 | Palanisamy | |
| 9,953,316 B2 | 4/2018 | Barnett et al. | |
| 9,996,835 B2 | 6/2018 | Dill et al. | |
| 10,361,856 B2* | 7/2019 | Cassin | H04L 9/3213 |
| 10,438,198 B1* | 10/2019 | Griffin | H04L 9/3213 |
| 2002/0082896 A1 | 6/2002 | Inagi | |
| 2003/0035569 A1 | 2/2003 | Chau | |
| 2003/0051150 A1 | 3/2003 | Jung | |
| 2004/0247126 A1 | 12/2004 | McClellan | |
| 2005/0108517 A1 | 5/2005 | Dillon et al. | |
| 2005/0166082 A1 | 7/2005 | Williams et al. | |
| 2006/0049255 A1 | 3/2006 | Von Mueller et al. | |
| 2006/0161750 A1 | 7/2006 | Perkins et al. | |
| 2007/0005974 A1 | 1/2007 | Kudou | |
| 2007/0067297 A1 | 3/2007 | Kublickis | |
| 2007/0101123 A1 | 5/2007 | Kollmyer et al. | |
| 2007/0246529 A1 | 10/2007 | Lalo et al. | |
| 2008/0049644 A1 | 2/2008 | Halbert | |
| 2008/0080713 A1 | 4/2008 | Cho et al. | |
| 2008/0109372 A1 | 5/2008 | Bykov et al. | |
| 2008/0201778 A1 | 8/2008 | Guo et al. | |
| 2008/0320297 A1 | 12/2008 | Sabo et al. | |
| 2008/0320317 A1 | 12/2008 | Funahashi et al. | |
| 2009/0048971 A1 | 2/2009 | Hathaway et al. | |
| 2009/0126017 A1 | 5/2009 | Chahal | |
| 2009/0294527 A1 | 12/2009 | Brabson et al. | |
| 2009/0327421 A1 | 12/2009 | Fu et al. | |
| 2010/0094755 A1 | 4/2010 | Kloster | |
| 2010/0107230 A1 | 4/2010 | Tyagi et al. | |
| 2010/0174626 A1 | 7/2010 | Stringfellow et al. | |
| 2010/0306635 A1 | 12/2010 | Tang et al. | |
| 2010/0325710 A1 | 12/2010 | Etchegoyen | |
| 2010/0325734 A1 | 12/2010 | Etchegoyen | |
| 2010/0332396 A1 | 12/2010 | Etchegoyen | |
| 2010/0332400 A1 | 12/2010 | Etchegoyen | |
| 2011/0035294 A1 | 2/2011 | Mizrah | |
| 2011/0082798 A1 | 4/2011 | Michaud et al. | |
| 2011/0093503 A1 | 4/2011 | Etchegoyen | |
| 2011/0093703 A1 | 4/2011 | Etchegoyen | |
| 2011/0179271 A1 | 7/2011 | Orsini et al. | |
| 2011/0196754 A1 | 8/2011 | Proud et al. | |
| 2011/0258272 A1 | 10/2011 | Drako et al. | |
| 2011/0307710 A1 | 12/2011 | McGuire et al. | |
| 2012/0018511 A1 | 1/2012 | Hammad | |
| 2012/0030209 A1 | 2/2012 | Bause et al. | |
| 2012/0054050 A1 | 3/2012 | Ziegler et al. | |
| 2012/0054493 A1 | 3/2012 | Bradley | |
| 2012/0066769 A1 | 3/2012 | Latchem et al. | |
| 2012/0084206 A1 | 4/2012 | Mehew et al. | |
| 2012/0150742 A1 | 6/2012 | Poon et al. | |
| 2012/0210421 A1 | 8/2012 | Ormazabal et al. | |
| 2012/0255034 A1 | 10/2012 | Orsini et al. | |
| 2012/0278335 A1 | 11/2012 | Bentkofsky et al. | |
| 2012/0317036 A1 | 12/2012 | Bower et al. | |
| 2012/0324113 A1* | 12/2012 | Prince | H04L 67/563 709/226 |
| 2012/0324242 A1 | 12/2012 | Kirsch | |
| 2013/0036098 A1 | 2/2013 | Mutalik et al. | |
| 2013/0097081 A1 | 4/2013 | Leavitt et al. | |
| 2013/0160038 A1 | 6/2013 | Slaney et al. | |
| 2013/0191887 A1 | 7/2013 | Davis et al. | |
| 2013/0212666 A1 | 8/2013 | Mattsson et al. | |
| 2013/0225213 A1 | 8/2013 | Antypas, III | |
| 2013/0242795 A1 | 9/2013 | Heen et al. | |
| 2013/0254117 A1 | 9/2013 | Von Mueller et al. | |
| 2013/0297579 A1 | 11/2013 | Andrew et al. | |
| 2013/0311434 A1 | 11/2013 | Jones | |
| 2013/0346302 A1 | 12/2013 | Purves et al. | |
| 2014/0013452 A1 | 1/2014 | Aissi et al. | |
| 2014/0025948 A1 | 1/2014 | Bestler et al. | |
| 2014/0032418 A1 | 1/2014 | Weber | |
| 2014/0052553 A1 | 2/2014 | Uzo | |
| 2014/0072188 A1 | 3/2014 | Liu et al. | |
| 2014/0173686 A1 | 6/2014 | Kgil et al. | |
| 2014/0197234 A1 | 7/2014 | Hammad | |
| 2014/0344921 A1 | 11/2014 | Hamlin et al. | |
| 2015/0150110 A1 | 5/2015 | Canning et al. | |
| 2015/0178819 A1 | 6/2015 | Kassemi et al. | |
| 2015/0199682 A1 | 7/2015 | Kalgi et al. | |
| 2015/0220635 A1 | 8/2015 | Deen et al. | |
| 2015/0220636 A1 | 8/2015 | Deen et al. | |
| 2015/0221336 A1 | 8/2015 | Deen et al. | |
| 2015/0229613 A1 | 8/2015 | Baum et al. | |
| 2015/0271150 A1 | 9/2015 | Barnett et al. | |
| 2015/0381582 A1 | 12/2015 | O'Hare et al. | |
| 2016/0087933 A1 | 3/2016 | Johnson et al. | |
| 2016/0148197 A1* | 5/2016 | Dimmick | G06Q 20/3674 705/67 |
| 2016/0189126 A1 | 6/2016 | Cheng et al. | |
| 2016/0219024 A1 | 7/2016 | Verzun et al. | |
| 2016/0241528 A1 | 8/2016 | Kulkarni et al. | |
| 2016/0342997 A1 | 11/2016 | De Tella et al. | |
| 2017/0017939 A1 | 1/2017 | Killoran, Jr. et al. | |
| 2017/0032361 A1 | 2/2017 | Purves et al. | |
| 2017/0053139 A1 | 2/2017 | Schenk et al. | |
| 2017/0063798 A1 | 3/2017 | Lapidous | |
| 2017/0104731 A1 | 4/2017 | Baudoin et al. | |
| 2017/0200150 A1 | 7/2017 | Cohn et al. | |
| 2017/0201498 A1 | 7/2017 | Baig et al. | |
| 2017/0300918 A1 | 10/2017 | Bernstein et al. | |
| 2017/0310709 A1 | 10/2017 | Foxhoven et al. | |
| 2018/0062832 A1 | 3/2018 | Hatcher | |
| 2018/0189502 A1* | 7/2018 | Kumar | H04L 9/0863 |
| 2018/0191735 A1 | 7/2018 | Lahoz et al. | |
| 2018/0198607 A1 | 7/2018 | Punekar et al. | |
| 2018/0309741 A1 | 10/2018 | Neafsey et al. | |
| 2018/0336366 A1 | 11/2018 | Scheiblauer | |
| 2018/0349875 A1 | 12/2018 | Barnett et al. | |
| 2018/0349891 A1 | 12/2018 | Putre et al. | |
| 2019/0207754 A1* | 7/2019 | Iyer | H04L 9/0877 |

(56) References Cited

U.S. PATENT DOCUMENTS

| | | | | |
|---|---|---|---|---|
| 2019/0318122 A1* | 10/2019 | Hockey | ................ | H04L 63/102 |
| 2019/0325445 A1* | 10/2019 | Anderson | ............ | G06Q 20/409 |
| 2019/0342295 A1* | 11/2019 | Peterson | ................ | G06Q 20/08 |

FOREIGN PATENT DOCUMENTS

| | | | |
|---|---|---|---|
| EP | 1482404 A2 | | 12/2004 |
| JP | 2001067324 | | 3/2001 |
| JP | 2005533416 | | 11/2005 |
| JP | 2006039631 | | 2/2006 |
| JP | 2006053599 | | 2/2006 |
| JP | 2008166894 | | 7/2008 |
| JP | 2009282525 | | 12/2009 |
| JP | 2011244460 | | 12/2011 |
| JP | 2013545411 | | 12/2013 |
| KR | 20090039301 | A | 4/2009 |

OTHER PUBLICATIONS

International Search Report and Written Opinion dated Sep. 4, 2015 for related PCT application No. PCT/US2015/21595.
Common Approval Scheme, Point of Interaction Protection Profile, Nov. 26, 2010 Version: 2.0, 161 pages.
Security Standards Council, Payment Card Industry (PCI) PIN Transaction Security (PTS) Point of Interaction (POI), Modular Security Requirements, Version 4.0 Jun. 2013, 59 pages.
European Search Report dated Jul. 19, 2017 in related European Patent Application No. 15765006.
European Search Report and European Search Opinion dated Oct. 13, 2017 in related European patent application No. 15765781.8.
Matt, Susan: "P2P Encryption", Jun. 23, 2011 (Jun. 23, 2011). XP055412989. Retrieved from the Internet: URL: http://www.elementps.com/Portals/0/P2P-Encryption-White-Paper.pdf.
First Data: "EMV and Encryption+Tokenization: A Layered Approach to Security" Jun. 1, 2012 (Jun. 1, 2012). XP055413104. Retrieved from the Internet: URL https://www.firstdata.com/downloads/thought-leadership/EMV-Encrypt-TokenizationWP.pdf.
International Search Report and Written Opinion dated Aug. 31, 2018 in International Patent Application No. PCT/US18/35850.
International Search Report and Written Opinion dated Aug. 23, 2018 in International Patent Application No. PCT/US18/35858.
International Search Report and Written Opinion dated Jan. 22, 2019 in related international patent application No. PCT/US18/55690.
International Search Report & Written Opinion dated Jul. 24, 2020 in international PCT application No. PCT/US2020/032734.
Ogigau-Neamtiu. "Tokenization as a data security technique." In: Zeszyty Naukowe AON. Jan. 26, 2016 (2016) Retrieved on Jul. 3, 2020 (Jul. 3, 2020) https://yadda.icm.edu.pl/baztech/element/bwmeta1.element.baztech-7680b362-6a77-420a-aff6-9409bfb9efe6/c/OGIGAU-NEAMTIU-Tokenization-as-a-data-security-technique.pdf.
European Search Report dated May 7, 2019 in related European Patent Application No. 18204443.8.
Extended European Search Report dated Dec. 8, 2020 for European Patent Application No. 18809547.5.
Extended European Search Report dated Jan. 29, 2021 for European Patent Application No. 18809760.
Dicky: "15 Really Usefull Web-based HTML Editors", WebDesignBooth, Jul. 17, 2009 (Jul. 17, 2009), XP055047393, Retrieved from the Internet: URL:http//www.webdesignbooth.com/15-really-usefull-web-based-html-editors/.
Introducing JSON, (http://www.json.org/json-en.html). (Year: 2021).

* cited by examiner

SYSTEMS AND PROCESSES FOR VAULTLESS TOKENIZATION AND ENCRYPTION

CROSS REFERENCE TO RELATED APPLICATION

This application is a continuation in part of:

U.S. patent application Ser. No. 15/931,432, filed May 13, 2020, entitled "SYSTEMS AND PROCESSES FOR VAULTLESS TOKENIZATION AND ENCRYPTION," which claims the benefit of and priority to U.S. Patent Application No. 62/847,010, filed May 13, 2019, entitled "SYSTEMS AND METHODS OF DATA COLLECTION AND PROCESSING LEVERAGING SECURE INLINE FRAMES AND DATA TOKENIZATION"; and U.S. patent application Ser. No. 15/997,205, filed Jun. 4, 2018, entitled "SYSTEMS AND METHODS FOR ONLINE PAYMENT PROCESSING USING SECURE INLINE FRAMES," which claims the benefit of and priority to U.S. Patent Application No. 62/514,324, filed Jun. 2, 2017, entitled "SECURE iFRAME,"

each of which are incorporated herein by reference in their entireties. In the case of a conflict of terms, the present disclosure governs.

BACKGROUND

Previous approaches to data tokenization include processes that can be increasingly computationally inefficient. Previous solutions typically utilize vaulted tokenization techniques storing encrypted data in a vault, alongside millions of other data entries, and associated with a vaulted token. In previous solutions, detokenization techniques to process vaulted tokens and transmit stored data may be inefficient, because vaulted data detokenization can involve computationally intensive processes indexing millions of data entries to identify a data entry associated with the vaulted token being detokenized. Because of indexing inefficiencies, computer processing workloads for previous solutions may be computationally expensive and/or time-intensive. Furthermore, the inherent inefficiency of previous solutions may worsen with use, because data vaults thereof become increasingly populated with data entries over time, causing undesirable increases in processing workloads for indexing the data vaults, and further increasing processing inefficiency.

In addition, previous solutions may inefficiently process network-enabled operations related to data tokenization and processing. For example, previous solutions reliant upon client systems for data intake may undesirably increase overall computational workloads, because the client systems must expend processing power receiving, processing, and transmitting the data. Previous solutions can also increase computing complexity associated with authentication-related processes. For example, in previous approaches, client systems may require a user to visit a secondary processor to provide sensitive data. In the same example, the client systems (e.g., and servers and processors thereof) may be required to expend computing resources executing a data reconciliation process (e.g., interacting with the secondary processor systems to authenticate and process data provided to the secondary processor systems. These steps add to the computing complexity, and also present additional opportunities for theft and/or misappropriation of confidential data.

Thus, there is an unmet need for a solution that collects data in a manner such that sensitive data never passes through particular servers, and that generates, from collected data, one or more vaultless tokens.

BRIEF SUMMARY OF THE DISCLOSURE

Briefly described, and according to one embodiment, aspects of the present disclosure generally relate to systems and methods for collecting, encrypting, and tokenizing information.

According to a first aspect, a data security system comprising: A) an iframe and tokenization system comprising: 1) an iframe service for producing iframes in communication with a token service; 2) the token service for creating and detokenizing format preserving vaultless tokens, wherein the iframe and tokenization system is communicatively connected to a partner system and configured to: I) receive an iframe request from a browser accessing the partner system, the iframe request comprising a template identifier representing a template defining one or more obfuscation parameters for data to be received by an iframe; II) provide the iframe to the browser accessing the partner system to be presented at the browser according to the template; III) receive certain data input into the iframe from the browser; IV) vaultlessly tokenize the certain data as one or more data tokens via the token service according to the one or more obfuscation parameters; V) store the one or more data tokens in a cache; VI) create a token identifier comprising an obfuscated version of the template identifier; VII) transmit the token identifier to browser to be passed to the partner system; and VIII) upon receiving the token identifier from the partner system, transmit the one or more data tokens to the partner system.

According to a second aspect, the data security system of the first aspect or any other aspect, wherein the iframe and tokenization system is further configured to: A) receive the one or more data tokens and token identifier; B) process the token identifier and extract the template identifier; and C) detokenize the one or more data tokens based on the template identifier.

According to a third aspect, the data security system of the second aspect or any other aspect, wherein the iframe and tokenization system receives the one or more data tokens and the token identifier from a third-party via an API.

According to a fourth aspect, the data security system of the second aspect or any other aspect, wherein the iframe and tokenization system receives the one or more data tokens and the token identifier from the partner system via an API.

According to a fifth aspect, the data security system of the second aspect or any other aspect, wherein the iframe and tokenization system receives the one or more data tokens and token identifier from the partner system.

According to a sixth aspect, the data security system of the second aspect or any other aspect, wherein the iframe and tokenization system receives the one or more data tokens and token identifier from a third-party system.

According to a seventh aspect, the data security system of the first aspect or any other aspect, wherein the one or more obfuscation parameters comprise format preserving tokenization.

According to an eighth aspect, the data security system of the seventh aspect or any other aspect, wherein the one or more obfuscation parameters comprise format preserving encryption.

According to a ninth aspect, the data security system of the eighth aspect or any other aspect, wherein after receiving the certain data input into the iframe, the iframe and tokenization system is configured to: A) vaultlessly tokenize a first portion of the certain data as one or more format preserving data tokens via the token service according to the one or more obfuscation parameters; and B) encrypt a second portion of the certain data as format preserving encryption via an encryption service operatively connected to the token service according to the one or more obfuscation parameters.

According to a tenth aspect, the data security system of the ninth aspect or any other aspect, wherein the iframe and tokenization system is configured to: A) receive the one or more format preserving data tokens and the token identifier; B) process the token identifier to extract the template identifier; C) retrieve the one or more obfuscation parameters via the template identifier; D) extract the first portion of the certain data by detokenizing the one or more format preserving data tokens based on the one or more obfuscation parameters; and E) extract the second portion of the certain data by decrypting the format preserving encryption based on the one or more obfuscation parameters.

According to an eleventh aspect, the data security system of the first aspect or any other aspect, wherein the iframe and tokenization system deletes the one or more data tokens from the cache after a predetermined amount of time.

According to a twelfth aspect, the data security system of the eleventh aspect or any other aspect, wherein the predetermined amount of time is about one hour.

According to a thirteenth aspect, the data security system of the first aspect or any other aspect, wherein the certain data comprises a SSN.

According to a fourteenth aspect, the data security system of the first aspect or any other aspect, wherein the certain data comprises a birthdate.

According to a fifteenth aspect, a data security system comprising: A) an iframe and tokenization system comprising: 1) an iframe service for producing iframes in communication with a token service; 2) a virtual terminal service for producing virtual terminals in communication with the token service; and 3) the token service for creating and detokenizing format preserving vaultless tokens, wherein the iframe and tokenization system is communicatively connected to one or more third-party systems and configured to: I) receive an iframe request from a browser accessing a first third-party system of the one or more third-party systems, the iframe request comprising a template identifier representing a template defining one or more obfuscation parameters for data to be received by an iframe; II) provide the iframe to the browser accessing the first third-party system to be presented at the browser according to the template; III) receive certain data input into the iframe from the browser; IV) vaultlessly tokenize the certain data as one or more data tokens via the token service according to the one or more obfuscation parameters; V) store the one or more data tokens in a cache; VI) create a token identifier comprising an obfuscated version of the template identifier; VII) transmit the token identifier to the browser to be passed to the first third-party system; VIII) upon receiving the token identifier from the first third-party system, transmit the one or more data tokens to the first third-party system; IX) provide a virtual terminal to a second third-party of the one or more third-party systems, the virtual terminal based on the template identifier; X) receive the one or more data tokens and token identifier via the virtual terminal; XI) detokenize the one or more data tokens based on the template identifier and token identifier; and XII) provide the certain data to the second third-party system via the virtual terminal.

According to a sixteenth aspect, the data security system of the fifteenth aspect or any other aspect, wherein the iframe and tokenization system is further configured to: A) receive the one or more data tokens and token identifier via an API; B) process the token identifier and extract the template identifier; and C) detokenize the one or more data tokens based on the template identifier.

According to a seventeenth aspect, the data security system of the sixteenth aspect or any other aspect, wherein the iframe and tokenization system receives the one or more data tokens and the token identifier from the first third-party via the API.

According to an eighteenth aspect, the data security system of the sixteenth aspect or any other aspect, wherein the iframe and tokenization system receives the one or more data tokens and the token identifier from third third-party of the one or more third-party systems via the API.

According to a nineteenth aspect, the data security system of the fifteenth aspect or any other aspect, wherein the one or more obfuscation parameters comprise format preserving tokenization.

According to a twentieth aspect, the data security system of the nineteenth aspect or any other aspect, wherein the one or more obfuscation parameters comprise format preserving encryption.

According to a twenty-first aspect, the data security system of the twentieth aspect or any other aspect, wherein after receiving the certain data input into the iframe, the iframe and tokenization system is configured to: A) vaultlessly tokenize a first portion of the certain data as one or more format preserving data tokens via the token service according to the one or more obfuscation parameters; and B) encrypt a second portion of the certain data as format preserving encryption via an encryption service operatively connected to the token service according to the one or more obfuscation parameters.

According to a twenty-second aspect, the data security system of the twenty-first aspect or any other aspect, wherein the iframe and tokenization system is configured to: A) receive the one or more format preserving data tokens and the token identifier; B) process the token identifier to extract the template identifier; C) retrieve the one or more obfuscation parameters via the template identifier; D) extract the first portion of the certain data by detokenizing the one or more format preserving data tokens based on the one or more obfuscation parameters; and E) extract the second portion of the certain data by decrypting the format preserving encryption based on the one or more obfuscation parameters.

According to a twenty-third aspect, the data security system of the fifteenth aspect or any other aspect, wherein the iframe and tokenization system deletes the one or more data tokens from the cache after a predetermined amount of time.

According to a twenty-fourth aspect, the data security system of the twenty-third aspect or any other aspect, wherein the predetermined amount of time is about one hour.

According to a twenty-fifth aspect, the data security system of the fifteenth aspect or any other aspect, wherein the certain data comprises a SSN.

According to a twenty-sixth aspect, the data security system of the fifteenth aspect or any other aspect, wherein the certain data comprises a birthdate.

According to a twenty-seventh aspect, a data security system comprising: A) an iframe and tokenization system comprising: 1) an iframe service for producing iframes in communication with a token service; 2) a virtual terminal service for producing virtual terminals in communication with the token service; and 3) the token service for creating and detokenizing format preserving vaultless tokens, wherein the iframe and tokenization system is communicatively connected to one or more third-party systems and configured to: I) provide a virtual terminal to a third-party system of the one or more third-party systems, the virtual terminal based on a pre-defined template including instructions for one or more obfuscation parameters for data; II) receive one or more data tokens and a token identifier via the virtual terminal, the one or more data tokens created from certain data received from an iframe defined by the pre-defined template and the token identifier including a template identifier associated with the pre-defined template; III) process the identifier to extract the template identifier; IV) upon verification that the template identifier corresponds to the pre-defined template, detokenize the one or more data tokens based on the one or more obfuscation parameters associated with the pre-defined template; and V) provide the certain data to the third-party system via the virtual terminal.

According to a twenty-eighth aspect, a data security process comprising: A) receiving two vaultless data tokens and an identifier; B) processing the identifier to extract a template identifier; C) retrieving one or more obfuscation parameters based on the template identifier; D) based on the one or more obfuscation parameters: 1) detokenizing a first vaultless data token of the two vaultless data tokens; and 2) decrypting a second vaultless data token of the two vaultless data tokens; and E) transmitting first data associated with the detokenized first vaultless data token and second data associated with the decrypted second vaultless data token to a third-party system.

According to a twenty-ninth aspect, the data security process of the twenty-eighth aspect or any other aspect, wherein the template identifier is associated with a template used to create an iframe for collecting the first data and second data.

According to a thirtieth aspect, the data security process of the twenty-ninth aspect or any other aspect, wherein the template defines the one more obfuscation parameters.

According to a thirty-first aspect, the data security process of the thirtieth aspect or any other aspect, wherein the first vaultless data token is format preserving.

According to a thirty-second aspect, the data security process of the thirty-first aspect or any other aspect, wherein the second vaultless data token is format preserving.

According to a thirty-third aspect, the data security process of the thirty-second aspect or any other aspect, wherein the first data and the second data are different types of data.

According to a thirty-fourth aspect, the data security system of the thirty-third aspect, wherein: A) the first data represents a SSN; and B) the second data represents a credit card number.

According to a thirty-fifth aspect, a data security process comprising: A) receiving an iframe request from a browser accessing a partner system, the iframe request comprising a template identifier representing a template defining one or more obfuscation parameters for data to be received by an iframe; B) providing the iframe to the browser accessing the partner system to be presented at the browser according to the template; C) receiving certain data input into the iframe from the browser; D) vaultlessly tokenizing the certain data as one or more data tokens via the token service according to the one or more obfuscation parameters; E) storing the one or more data tokens in a cache; F) creating a token identifier comprising an obfuscated version of the template identifier; G) transmitting the token identifier to browser to be passed to the partner system; and H) upon receiving the token identifier from the partner system, transmitting the one or more data tokens to the partner system.

According to a thirty-sixth aspect, the data security process of the thirty-fifth aspect or any other aspect, where in the process further comprises: A) receiving the one or more data tokens and token identifier; B) processing the token identifier and extract the template identifier; and C) detokenizing the one or more data tokens based on the template identifier.

According to a thirty-seventh aspect, the data security process of the thirty-sixth aspect or any other aspect, wherein the process further comprises receiving the one or more data tokens and the token identifier from a third-party via an API.

According to a thirty-eighth aspect, the data security process of the thirty-sixth aspect or any other aspect, wherein the process further comprises receiving the one or more data tokens and the token identifier from the partner system via an API.

According to a thirty-ninth aspect, the data security process of the thirty-sixth aspect or any other aspect, wherein the process further comprise receiving the one or more data tokens and token identifier from the partner system.

According to a fortieth aspect, the data security process of the thirty-sixth aspect or any other aspect, wherein the process further comprises receiving the one or more data tokens and token identifier from a third-party system.

According to a forty-first aspect, the data security process of the thirty-fifth aspect or any other aspect, wherein the one or more obfuscation parameters comprise format preserving tokenization.

According to a forty-second aspect, the data security process of the forty-first aspect or any other aspect, wherein the one or more obfuscation parameters comprise format preserving encryption.

According to a forty-third aspect, the data security process of the forty-second aspect or any other aspect, wherein after receiving the certain data input into the iframe, the process comprises: A) vaultlessly tokenizing a first portion of the certain data as one or more format preserving data tokens via the token service according to the one or more obfuscation parameters; and B) encrypting a second portion of the certain data as format preserving encryption via an encryption service operatively connected to the token service according to the one or more obfuscation parameters.

According to a forty-fourth aspect, the data security process of the forty-third aspect or any other aspect, wherein the process further comprises: A) receiving the one or more format preserving data tokens and the token identifier; B) processing the token identifier to extract the template identifier; C) retrieving the one or more obfuscation parameters via the template identifier; D) extracting the first portion of the certain data by detokenizing the one or more format preserving data tokens based on the one or more obfuscation parameters; and E) extracting the second portion of the certain data by decrypting the format preserving encryption based on the one or more obfuscation parameters.

According to a forty-fifth aspect, the data security process of the thirty-fifth aspect or any other aspect, wherein the process further comprise deleting the one or more data tokens from the cache after a predetermined amount of time.

According to a forty-sixth aspect, the data security process of the forty-fifth aspect or any other aspect, wherein the predetermined amount of time is about one hour.

According to a forty-seventh aspect, the data security process of the forty-fifth aspect or any other aspect, wherein the predetermined amount of time is about 1 minute to 24 hours.

According to a forty-eighth aspect, the data security process of the thirty-fifth aspect or any other aspect, wherein the certain data comprises a SSN.

According to a forty-ninth aspect, the data security process of the thirty-fifth aspect or any other aspect, wherein the certain data comprises a birthdate.

According to a fiftieth aspect, a data security process comprising: A) receiving an iframe request from a browser accessing a first third-party system of one or more third-party systems, the iframe request comprising a template identifier representing a template defining one or more obfuscation parameters for data to be received by an iframe; B) transmitting the iframe to the browser accessing the first third-party system to be presented at the browser according to the template; C) receiving certain data input into the iframe from the browser; D) vaultlessly tokenizing the certain data as one or more data tokens via the token service according to the one or more obfuscation parameters; E) storing the one or more data tokens in a cache; F) creating a token identifier comprising an obfuscated version of the template identifier; G) transmitting the token identifier to the browser to be passed to the first third-party system; H) upon receiving the token identifier from the first third-party system, transmitting the one or more data tokens to the first third-party system; I) providing a virtual terminal to a second third-party of the one or more third-party systems, the virtual terminal based on the template identifier; J) receiving the one or more data tokens and token identifier via the virtual terminal; K) detokenizing the one or more data tokens based on the template identifier and token identifier; and L) providing the certain data to the second third-party system via the virtual terminal.

According to a fifty-first aspect, the data security process of the fiftieth aspect or any other aspect, wherein the process further comprises: A) receiving the one or more data tokens and token identifier via an API; B) processing the token identifier and extract the template identifier; and C) detokenizing the one or more data tokens based on the template identifier.

According to a fifty-second aspect, the data security system of the fifty-first aspect or any other aspect, wherein the iframe and tokenization system receives the one or more data tokens and the token identifier from the first third-party via the API.

According to a fifty-third aspect, the data security process of the fifty-first aspect or any other aspect, wherein the process further comprises receiving the one or more data tokens and the token identifier from third third-party of the one or more third-party systems via the API.

According to a fifty-fourth aspect, the data security process of the fiftieth aspect or any other aspect, wherein the one or more obfuscation parameters comprise format preserving tokenization.

According to a fifty-fifth aspect, the data security process of the fifty-fourth aspect or any other aspect, wherein the one or more obfuscation parameters comprise format preserving encryption.

According to a fifty-sixty aspect, the data security process of the fifty-fifth aspect or any other aspect, wherein after receiving the certain data input into the iframe, the process further comprises: A) vaultlessly tokenizing a first portion of the certain data as one or more format preserving data tokens via the token service according to the one or more obfuscation parameters; and B) encrypting a second portion of the certain data as format preserving encryption via an encryption service operatively connected to the token service according to the one or more obfuscation parameters.

According to a fifty-seventh aspect, the data security process of the fifty-sixth aspect or any other aspect, wherein the process further comprises: A) receiving the one or more format preserving data tokens and the token identifier; B) processing the token identifier to extract the template identifier; C) retrieving the one or more obfuscation parameters via the template identifier; D) extracting the first portion of the certain data by detokenizing the one or more format preserving data tokens based on the one or more obfuscation parameters; and E) extracting the second portion of the certain data by decrypting the format preserving encryption based on the one or more obfuscation parameters.

According to a fifty-eighth aspect, the data security process of the fiftieth aspect or any other aspect, wherein the process further comprises deleting the one or more data tokens from the cache after a predetermined amount of time.

According to a fifty-ninth aspect, the data security process of the fifty-eighth aspect or any other aspect, wherein the predetermined amount of time is about one hour.

According to a sixtieth aspect, the data security process of the fifty-eighth aspect or any other aspect, wherein the predetermined amount of time is between 30 seconds and 48 hours.

According to a sixty-first aspect, the data security process of the fiftieth aspect or any other aspect, wherein the certain data comprises a SSN.

According to a sixty-first aspect, the data security process of the fiftieth aspect or any other aspect, wherein the certain data comprises a birthdate.

According to a sixty-third aspect, a data security process comprising: A) providing a virtual terminal to a third-party system, the virtual terminal based on a pre-defined template including instructions for one or more obfuscation parameters for data; B) receiving one or more data tokens and a token identifier via the virtual terminal, the one or more data tokens created from certain data received from an iframe defined by the pre-defined template and the token identifier including a template identifier associated with the pre-defined template; C) processing the identifier to extract the template identifier; D) upon verification that the template identifier corresponds to the pre-defined template, detokenizing the one or more data tokens based on the one or more obfuscation parameters associated with the pre-defined template; and E) providing the certain data to the third-party system via the virtual terminal.

As used herein, an "inline frame" (iframe) is an HTML document embedded inside another HTML document on a page; herein, iframes are managed by an iframe service and are typically used for data collection (although other uses are contemplated). For example, an iframe service may be used to collect sensitive data on a page, without the page servers receiving the sensitive data, while still allowing control over the appearance of the page and process (e.g., the page appears to be constructed by one entity, without embedded iframe documents from a third-party).

As used herein, "tokenization" refers to a process by which original data is transformed into a token (e.g., a string of random or seemingly random characters), which may be later used to obtain the original data. As used herein a "vaultless token" refers to a token that is derived from an original set of data by using an algorithm and an identifier (e.g., the token is generally not stored or not stored long term). Thus, as described herein, a vaultless token may be transformed (via an algorithm and the identifier) back into original data from which the token was sourced. In various embodiments, tokens produced by the present systems and methods may be vaultless and format-preserving.

As used herein, "format-preserving" refers to an aspect of a token in which the token includes one or more elements of original data from which was the token was derived. For example, a format-preserving token may retain the first four and last four digits of data from which the token was derived.

Provided herein are systems and processes for: 1) providing iframe elements to a browser that renders an iframe along with operator content; 2) collecting original data via the one or more iframe elements such that the original data never passes through a server controlled by the operator; 3) providing original data to a token service; 4) generating, via the tokenization service, a token or tokens that are associated with the original data; 5) generating an identifier associated with the generated token; 6) temporarily storing the token in a cache; 7) transmitting the generated identifier to the operator, to a partner thereof, or other destinations; 8) receiving a request from the operator system (or other verified entity) for the generated token, the request including the identifier; and 9) transmitting the generated token to the operator (or other verified entity). According to one embodiment, the systems and processes include: 1) receiving tokens and an identifier associated with an action to create the tokens from a partner; 2) detokenizing the tokens to obtain original data; and 3) transmitting the original data to the operator, to the partner thereof, or other destinations. In one or more embodiments, the system is a computing environment configured to operate one or more services for receiving, tokenizing, and detokenizing data.

In at least one embodiment, the system includes an iframe service for collecting data and a tokenization service for tokenizing and detokenizing data. According to one embodiment, the system includes an encryption service, which may also be the tokenization service, for encrypting and decrypting data. In various embodiments, the system is accessible to users and partners that submit requests causing various functions to be executed by the system. In one or more embodiments, the various functions include, but are not limited to, providing (de)tokenization and/or encryption services, as well as creating and storing templates for iframe data collection, tokenization, and encryption. According to one embodiment, the system includes a template service for generating templates for iframes and virtual terminals. In at least one embodiment, the template service facilitates generation of tokenization, encryption, and/or detokenization templates including parameters for receiving original data via iframes or at a virtual terminal, and for transforming original data into vaultless tokens (and vice versa).

According to one embodiment, a virtual terminal is a page that provides a user access to one or more of tokenization, detokenization, encryption, and/or decryption services based on a template and, in some embodiments, the particular user accessing the virtual terminal. In various embodiments, a virtual terminal includes a collection of parametrized fields that are configured based on templates associated with the authorized users. In one or more embodiments, the parametrized fields are for receiving various original data or token data types, such as, for example, tokenized card data, original social security numbers, and other data and detokenizing, tokenizing, encrypting, or decrypting such data.

In various embodiments, the iframe service causes the rendering of preconfigured iframes with content controlled by a processing partner of the user. According to one embodiment, the iframes include fields for receiving original data that, upon being entered into a field, is received directly at the iframe service such that the original data never passes through the user's or partner's web infrastructure (e.g., servers, etc.). In at least one embodiment, the iframes are generated from template parameters and, therefore, the iframes are configurable by the user via template generation processes.

In one or more embodiments, the tokenization service may receive original data and tokens (vaultless or otherwise) from the iframe service or at a virtual terminal. In at least one embodiment, the tokenization service may generate vaultless tokens from received original data, and may regenerate original data from received vaultless tokens. According to one embodiment, the tokenization services performs tokenization and detokenization processes based on template parameters and, thus, tokenization and detokenization processes are configurable by the user via template generation processes.

In one or more embodiments, the system generates and utilizes identifiers to authenticate and secure access to iframe and tokenization services, to virtual terminals, and other elements of the system. According to one embodiment, each tokenization and/or encryption action causes the system to generate a unique identifier that is associated with the tokenization and/or encryption action (or associated with both) and that may be utilized by the system to identify parameters used to perform the tokenization/encryption. According to one embodiment, the unique identifier includes a template identifier used for retrieving instructions/data for detokenizing a token to obtain original data. In various embodiments, the system may only perform detokenization processes upon receiving of the unique identifier that was generated during a previous, corresponding tokenization process. In some embodiments, the system may not store the identifier, but may be configured to process portions of a received identifier to extract various data for verifying an identity of a system (e.g., a user, user partner, etc.) providing the identifier to the system.

In various embodiments, an identifier includes other keys or identifiers associated with users and partners thereof. In one or more embodiments, the unique identifier may include extractable segments including, but not limited to, one or more of: 1) a template identifier segment; 2) an encoded timestamp; 3) an encrypted data value (e.g., a SALT data value for ensuring uniqueness of the identifier); 4) an application reference; and 5) other data.

In one or more embodiments, the system includes a template service for executing various template generation processes. According to one embodiment, the template service allows a user to generate a template for an iframe and/or a virtual terminal. In at least one embodiment, the template service allows for selection of various data fields to be rendered in an iframe, each data field for receiving a specific type of data. In one or more embodiments, the template service allows for configuration of various tokenization and/or encryption parameters including, but not limited to, data type, and format preservation method. In some embodiments, the template service stores templates in a data store and generates template identifiers corresponding to each stored template. In various embodiments, when the system generates an identifier, the identifier includes a template identifier and, thereby, an identifier may include data used for instructing a tokenization service how to perform detokenization, and/or decryption services. In one example, the system concatenates an identifier with a template identifier in a manner such that parsing the identifier provides the template identifier.

These and other aspects, features, and benefits of the claimed systems and processes will become apparent from the following detailed written description of embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
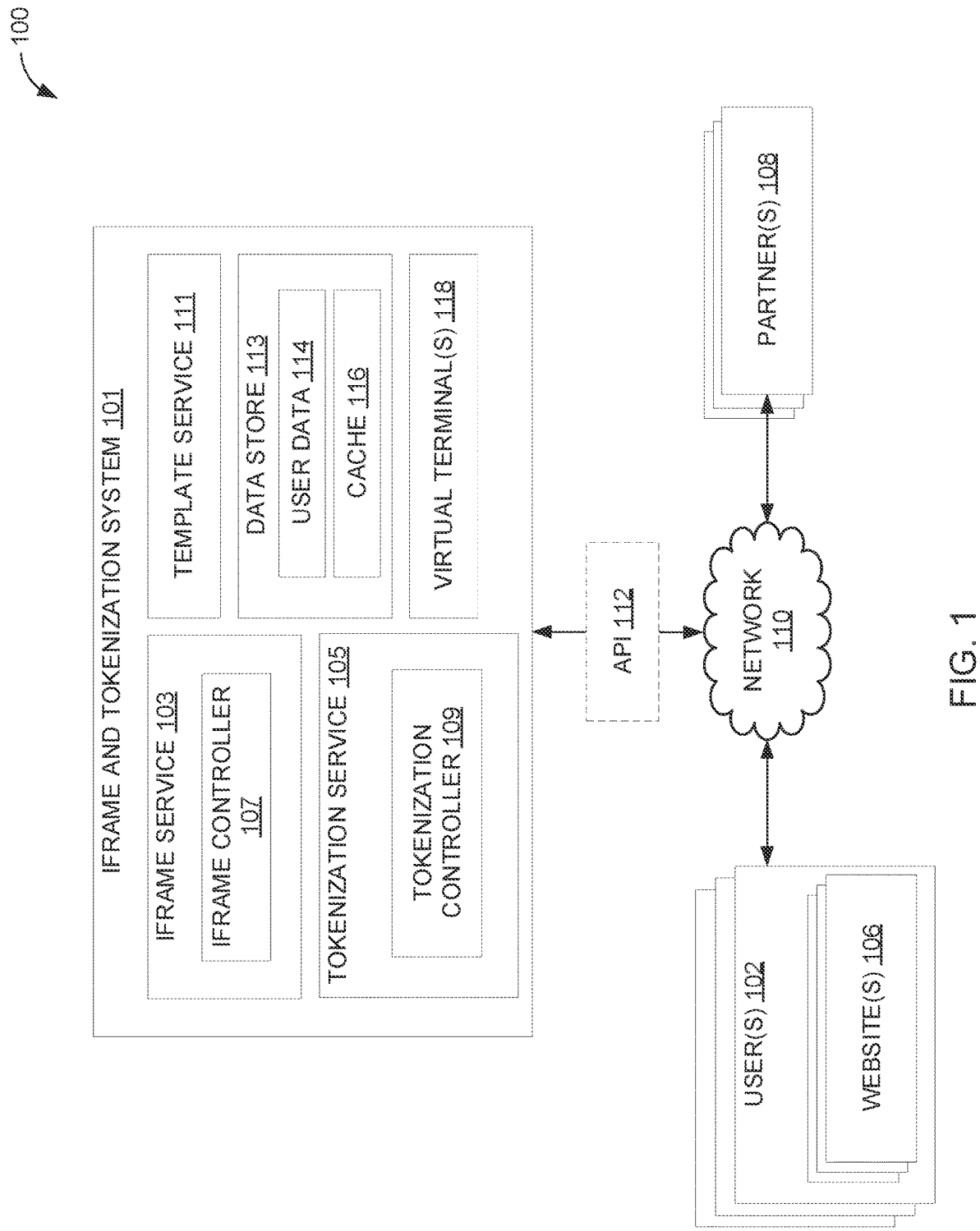
FIG. 1 illustrates an exemplary networked environment, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to a sole custodian system for collecting and tokenizing sensitive data, and for sharing sensitive data in an obfuscated form. In various embodiments, the present systems and processes may eliminate the need for one or more websites and/or processing partners to collect or process original data through their respective systems. In at least one aspect, having a single system remotely manage and store iframe data and manage tokenization and/or encryption information may improve data security and processing efficiency while reducing the likelihood of original data being exposed to unauthorized, fraudulent, and/or adverse parties. In one or more embodiments, the present systems and processes allow for (de)tokenization, encryption, and/or detokenization to be provided as a service to one or more users. According to one embodiment, the present systems and processes include one or more systems or methods for providing service-based functions as described in U.S. Pat. No. 9,461,973, entitled "SYSTEMS AND METHODS FOR DECRYPTION AS A SERVICE," filed Mar. 19, 2015, which is incorporated herein by reference in its entirety. In the case of a conflict of terms, the present disclosure governs.

In various embodiments, the present systems and methods may utilize vaulted or vaultless tokens. In one embodiment, vaulted tokens refer to non-derived, random character strings that form one half of a relational pair (the other half being original data, such as iframe values). In one or more embodiments, vaulted tokenization includes storing original data in a relational table, wherein each original data entry is associated with a corresponding vaulted token. Accordingly, in at least one embodiment, processing via vaulted tokenization involves mapping (via indexing and/or lookups) a received, vaulted token to a corresponding original data item located somewhere in a relational table. Thus, vaulted tokenization includes storing original data in a secure database (e.g., a "vault") to await future detokenization requests.

In various embodiments, in contrast to vaulted tokens, vaultless (e.g., stateless) tokens may be derived from original data using an algorithm (and, in some embodiments, a client or partner key). In one embodiment, vaultless tokenization includes receiving original data and deriving, from the original data and via an algorithm, a string of characters (i.e., a token). Accordingly, in at least one embodiment, a vaultless token is not one half of a relational pair (e.g., the other half being original data stored in a database). Instead, a vaultless token may include original data, but in an obfuscated format. In various embodiments, because original data can be re-derived from an associated vaultless token, a need to store relational tables in a secured database is eliminated (i.e., a "vault" is not required, hence "vaultless"). In at least one embodiment, because computationally expensive indexing/lookup activities are not required, vaultless tokenization may provide lower latency and faster processing speeds than vaulted tokenization. In some embodiments, a hybridized vaultless system is implemented in which vaultless tokens are stored temporarily for a predetermined time period (e.g., 24 hours or another suitable time frame). In various embodiments, the cached tokens are automatically deleted following the predetermined time period, upon receipt of a notification, or via a command. In at least one embodiments, cached tokens are used to re-derive original data (e.g., using an identifier and one or more algorithms).

The present systems and methods may drastically improve the security of information collection and processing by leveraging secure iframes and vaultless, format-preserving tokenization and/or encryption of sensitive information. According to one embodiment, because the present systems leverage secure iframe serving processes and vaultless tokenization and/or encryption processes, sensitive information never passes into a user's system in original form and, instead, may only be represented in the user's system as a vaultless and, in some embodiments, encrypted token. In further embodiments, in the event that the user's system is breached and tokens are stolen, the stolen tokens are useless and devoid of value because the tokens do not include any useful original data. The tokens may be secured against unauthorized detokenization because access to a tokenization service is controlled using identifiers and other parameters, such as a network whitelist, and, thus, an attacker is unable to detokenize stolen tokens into original data. Thus, in at least one embodiment, stolen tokens cannot be utilized by parties other than the user and one or more partners approved by the user.

In various embodiments, the present disclosure provides a system including an iframe service and a tokenization service. In at least one embodiment, the iframe service renders iframes on a user's website, the iframes being configured for receiving one or more specific data types. According to one embodiment, the tokenization service tokenizes and/or encrypts original data from iframes or other authorized sources into tokens, and also detokenizes tokens into original data. In various embodiments, the system is configured to provide one or more virtual terminals, for example, in a webpage hosted by the system. In at least one embodiment, a virtual terminal provides access to one or more of tokenization, detokenization, encryption, and decryption services. According to one embodiment, the system generates a virtual terminal and provides access to and executes various functions therefore based on a template. For example, a template includes parameters for a first input field for receiving social security numbers to be encrypted, and includes a second input field for receiving email addresses to be tokenized.

In one or more embodiments, access to virtual terminals and to the iframe and tokenization services is facilitated and secured using an application programming interface (API). For example, requests to serve up iframes on a user website are provided and validated via the API, and, correspondingly, iframes are served via the API to a browser that renders the iframes on the user website. In another example, requests and data submitted to a virtual terminal are passed to the system via an API, and tokens and identifiers are provided to the virtual terminal via the API. According to one embodiment, the API includes a whitelist for verifying network credentials (e.g., IP address, MAC address, etc.) from a user attempting to access the system, the whitelist including sets of valid network credentials.

As described herein, in one or more embodiments, the system generates and processes identifiers (e.g., token identifiers and/or other identifiers) to authenticate access to system functions and services, such as iframe and tokenization services. In one or more embodiments, an identifier may be an alphanumeric sequence, a hexadecimal sequence, a base64 sequence and/or an encrypted sequence. In various embodiments, an identifier may include information associated with a corresponding site and/or system user (e.g., the owner of the site). In at least one embodiment, the information may include, but is not limited to: 1) a template ID; 1) a template ID segment; 2) an encoded timestamp; 3) an encrypted value (e.g., a SALT value for ensuring uniqueness of the identifier); 4) an application reference; and 5) other information.

In one or more embodiments, an identifier includes information for retrieving instructions for performing tokenization, detokenization, encryption, and/or decrypted activities according to desired parameters specified by a user during template generation processes. In various embodiments, the identifier includes a first segment of information required to perform requested system processes, and the system retrieves a second segment of required information from a database based on performing a look-up using the first segment of information. According to one embodiment, the identifier includes one or more secondary identifiers, such as a template ID, that are used to access stored parameters via a look-up process performed, for example, by a template service. In at least one embodiment, the system includes the identifier in any transmissions of generated tokens and/or detokenized information to the site and/or user. According to one embodiment, an identifier is generated for each transaction, which may include tokenization and/or encryption (or, in some embodiments, detokenization or decryption) processes, and the identifier is transmitted to a user that requested execution of the process(es). In various embodiments, the requesting user includes the identifier in subsequent requests to the system for execution of various actions including, but not limited to, transmitting generated tokens to the requesting user, deleting temporarily cached tokens, and detokenizing or decrypting tokens or data into original data that is transmitted to the requesting user.

The following paragraph provides a non-limiting example of one embodiment of the system. In one example, a user hosts a website for purchasing airline tickets; however, the user does not wish to collect or process sensitive payment processing information through their own system. The present system allows the user to build a template for generating an iframe that is rendered within the user's website and allows for the collection of customers' sensitive payment processing information directly into the present system without being passed through the user's system. Each time sensitive payment processing information is collected via the iframe, the present system tokenizes the collected data based on parameters configured within the template, and the system temporarily stores the output tokens in a cache. The system generates a unique identifier that includes a template ID associated with the template, and the system transmits the unique identifier to the user. The user transmits the unique identifier to the system in a request for transmission of the cached tokens. The system authenticates the unique identifier and transmits the tokens to the user. The user transmits the tokens and the identifier to a transaction processing partner that transmits a detokenization request to the present system, the request including the identifier and the tokens. The system extracts the template ID from the identifier and retrieves the template parameters, including obfuscation parameters used for the original tokenization process. The system detokenizes the tokens according to the parameters, thereby generating the original payment processing information. The system transmits the payment processing information to the transaction processing partner that uses the data to execute one or more transactions on behalf of the user and one or more customers thereof. The system may also delete the cached tokens following a predetermined time period or in response to fulfilling the detokenization request. Thus, in the above example, the system enables the user to carry out customers' ticket purchases without ever passing the customers' sensitive payment information through the users' system.

In one or more embodiments, to enable iframe collection of original data, the system performs an initial template generation process and, as an output, generates a template and template ID (template ID associated with the generated template). In at least one embodiment, the template establishes the appearance of a virtual terminal and/or an iframe rendered within a website, and also specifies one or more tokenization and/or encryption parameters used for tokenizing and/or encrypting data received via the iframe. According to one embodiment, the template ID is an identifier that is used to identify stored template parameters via a look-up process. In one embodiment, the system provides the user with a plurality of template configuration fields in which the owner may define the one or more tokenization and encryption parameters. In various embodiments, the one or more tokenization or encryption parameters include, but are not limited to, data type(s) and format preservation method(s). In at least one embodiment, data type refers to a type of information that will collected via the system iframe service.

In various embodiments, format preservation method refers to the scheme in which the system will preserve one or more elements of original information in a corresponding token. For example, in a particular format preservation method, the system generates, from original information of a data type "social security number," a token that retains the last four characters of the original information. Thus, from the original information of, the system may produce a token which retains the last four digits of the original information (e.g., the last four digits of a social security number). In one example, a user desires tokenization of customer social security numbers (SSNs) but wishes to preserve the last four digits of the SSNs so that their system displays customer credential information that is recognizable to the customer. In the same example, a tokenization template configured by the user includes a format preservation parameter that causes tokens generated from iframe-collected SSNs to retain the last four digits of the SSNs respectively. According to one embodiment, the format preservation allows for users and partners to utilize the security benefits of tokenization or encryption while retaining various functionalities data treatment and organization functions of other systems (e.g., such as internal, proprietary systems).

In one or more embodiments, the system receives selections defining the one or more tokenization or encryption parameters from the user and generates and stores a template and template ID based on the selections. According to one embodiment, a template (e.g., and an iframe rendered therefrom) provides for configuration of tokenization or encryption processes for each data type in the template. In various embodiments, a template includes a plurality of data fields and each data field includes a parameter for determining whether format-preserving tokenization (FPT) or format-preserving encryption (FPE) is to be performed on data input to the field. In one example, a template includes a social security number (SSN) data field and a credit card number data field. In the same example, the SSN data field includes a parameter for FPE and the credit card number data field includes a parameter for FPT. Continuing the same example, SSNs input to the SSN data field are tokenized while credit card numbers input to the credit card number data field are encrypted.

In at least one embodiment, the template ID provides the system information to tokenize and detokenize information and tokens collected via the iframe service. In various embodiments, whenever a transaction is performed (e.g., a collection of data from an iFrame or virtual terminal and tokenization or encryption of the data), the system generates a unique identifier that includes the template ID associated with the template from which parameters were used to perform the action. In one or more embodiments, the system may use authentication of an identifier to secure virtual terminal access, as well as access to iframe and tokenization services.

According to one embodiment, the system serves a webpage including a virtual terminal for providing access to tokenization, detokenization, encryption, and/or decryption processes. In various embodiments, the virtual terminal is configured to receive original data for tokenization, detokenization, encryption, decryption, or various combinations thereof. In one or more embodiments, partners and other third-parties associated with a user are provided access to the virtual terminal, for example, by the user adding the partners and other third-parties to a list of approved clients. According to one embodiment, upon an approved user logging into the system, the approved client is able to access a virtual terminal and select one or more templates configured by the user, the selected template controlling an appearance and function of the virtual terminal. Thus, in at least one embodiment, the virtual terminal allows a user to easily share tokenization and encryption capabilities with desired entities such that the system may function as a sole custodian of a portion of or all sensitive data that would otherwise (e.g., in previous approaches) be directly received at a system controlled by the user or by third-parties and partners associated therewith.

In various embodiments, the virtual terminal includes various fields based on a template and template parameters stored in the system. In at least one embodiment, a process for generating a template includes a selectable option enabling access to a virtual terminal based on the template, the access being provided to partners and third-parties specified by the user in an access list stored by the system. According to one embodiment, a user, partner, or third-party enters information into the virtual terminal, which is then encrypted or tokenized according the parameters (e.g., obfuscation parameters) set by the user when setting up the template. In some embodiments, tokens representing the data entered into the iframe are sent to one or more predetermined destinations, such as a particular user, or partner thereof.

The following paragraph provides a non-limiting example of one embodiment of the present system. In one example, a user is associated with a partner that initiates customer transactions on behalf of the user; however, neither the user nor the partner wishes to pass customers' sensitive information through their own systems. The user provides the partner with a link to a virtual terminal that the partner uses to collect information from a customer (e.g., credit card information or the like). The partner inputs original data including credit card information into the virtual terminal. Upon receipt of the original data, the system tokenizes the information into a format-preserved token, temporarily caches the token, and generates and sends a unique identifier to the partner. The partner provides the unique identifier to the user, and the user requests from the system, and receives in response, the cached token. The user shares the token and identifier with a second partner that requests, from the system, detokenization of the token and transmission of the transaction processing information. Continuing the example, the second partner receives the transaction processing information and authenticates the customers' transactions that were initiated with the first partner, thereby completing the transactions. Thus, in the example, the system allows the user and partners thereof to securely facilitate customer transactions without the customers' transaction processing information being passed through the user's or the first partner's systems.

Exemplary Embodiments

Referring now to the figures, for the purposes of example and explanation of the fundamental processes and components of the disclosed systems and methods, reference is made to FIG. 1, which illustrates an exemplary, high-level overview of one embodiment of a networked environment 100. As will be understood and appreciated, the exemplary networked environment 100 shown in FIG. 1 represents merely one approach or embodiment of the present system, and other aspects are used according to various embodiments of the present system.

In various embodiments, the networked environment 100 includes an iframe and tokenization system 101. In at least one embodiment, the system 101 includes an iframe service 103, a tokenization service 105, a template service 111, and a data store 113. In one or more embodiments, the iframe service 103, tokenization service 105, and template service 111 each include one or more processors, servers, and databases for executing the various functions described herein. In one or more embodiments, the system 101 is operative to communicate with one or more users 102, websites 106, and partners 108 via a network 110. A user 102 may be an entity, such as company, that operates a website 106. For example, a user 102 may be an online retailer, an airline, a university, or various other entities that desire collection and tokenization of original data in manner such that the original data is not passed through the entity/user's system. A partner 108 may be an entity that performs various services for the user 102. For example, a partner 108 may be a retailer that accepts a credit card provided by a user 102 to its customers. Non-limiting examples of partners 108 include, but are not limited to, transaction processing entities, retailers, oversight entities (such as a government institution), and research entities, among others.

According to one embodiment, communications with the system 101 are controlled via an application programming interface (API) 112. In various embodiments, the API facilitates access, by the user 102, website 106 and/or processing partner 108, to the system 101 (e.g., and services therein). In at least one embodiment, the API 112 is only accessible to and/or will only respond to or accept calls from verified and/or approved users 102, websites 106, and partners 108 (e.g., where verification is determined network credentials and/or an identifier). In one or more embodiments, access to the API 112 may require verification of identity using various methods such as comparing information of a requesting entity to a whitelist of approved entities. In at least one embodiment, by this exemplary method, the present systems and processes may preclude fraudulent and/or unauthorized parties (e.g., hackers, etc.) from accessing systems services even in the event that tokens are stolen. According to one embodiment, because access to the systems services is dependent upon both the identity (e.g., network credentials) of the entity and an identifier (e.g., a token identifier), the fraudulent and/or unauthorized parties may be presented with multiple barriers to utilizing stolen tokens and obtaining original data.

In one or more embodiments, system 101 includes the data store 113. In at least one embodiment, the data store 113 includes a first data center for storing user data 114 and a second proxy data center for temporary storage of original data received via the iframe service 103 or from a virtual terminal 118 and/or for temporary (e.g., time limited) storage of one or more "vaultless" tokens. According to one embodiment, the second proxy data center includes a cache 116 for temporary storage of one or more vaultless tokens. In various embodiments, the cache 116 stores tokens in one or more relational tables configured such that a stored token is retrievable via a look-up process based on an identifier. In at least one embodiment, the cache 116 is configured for automated deletion of stored original data or vaultless tokens following a predetermined time period (e.g., 24 hours, 1 hour, etc.), following detection of an event, such as receipt of a notification from a user 102 or partner 108, or following a input of a command by an administrator of the system 101, a user 102, and/or a partner 108. In one example, the system 101 receives, from a user 102, an identifier and a command for deleting stored tokens associated with the identifier. In the same example, the system 101 performs a look-up process to identify and purge stored tokens associated with the identifier from the cache 116.

In one example, the iframe service 103 collects and tokenizes payment processing data for a transaction initiated on a retail site of a user 102, stores the output tokens in the cache 116, and transmits an identifier associated therewith to a user 102. In the same example, the user 102 uses the identifier to request transmission of the cached tokens, and, upon receiving the tokens, the user 102 shares the tokens and the identifier with a processing partner 108. Continuing the example, the processing partner 108 requests detokenization of the tokens from the system 101 and receives the payment processing data. In the same example, the partner 108 uses the payment processing data to authenticate the transaction and, upon completion of the transaction, the system 101 receives a deletion authorization from the processing partner 108 that causes the copies of the tokens to be deleted from the cache 116.

In one or more embodiments, the temporary storage of tokens allows for tokens to be funneled to a partner 108 for efficient and secure processing of transactions on behalf of user 102 based on the original data collected from a website 106 controlled by the user 102. According to one embodiment, the processing is secure because original data is not passed through a system controlled by the user 102, but is tokenized and funneled to the partner 108.

In one or more embodiments, the data store 113 includes user data 114 and other information associated with operations of the system 100. In at least one embodiment, the user data 114 includes various information associated with users 102 including, but not limited to: 1) user credentials, such as an IP address, MAC address, username, password, etc.; 2) template data, such as template IDs and template parameters associated with a user 102; 3) performance data including counters for tracking a number of tokenization, detokenization, and iframe events requested by a user 102; 4) contact information for contacting a user 102 or partner 108 thereof, exemplary contact information including an email address, telephone number, etc.; 5) partner credentials, such as an IP address, MAC address, username, etc. of each partner associated with a user 102.

In one or more embodiments, the iframe service 103 performs actions including, but not limited to: 1) receiving requests for iframe elements from a user 102, website 106 or processing partner 108; 2) serving iframe elements to websites 106 that are controlled by a user 102 or partner 108 associated therewith; 3) receiving original data (also referred to as iframe values) from the provided iframe elements; 4) sending received iframe values to the tokenization service 105; 5) receiving token from the tokenization service 105; and 6) transmitting tokens to users 102, websites 106, processing partners 108.

In various embodiments, the iframe service 103 includes one or more iframe controllers 107 for serving iframes and for collecting inputs therefrom. According to one embodiment, the website 106 may be controlled by a user 102 or a processing partner 108. In at least one embodiment, upon receiving a request from a website 106, the iframe controller 107 is configured to generate and serve iframe elements to a predetermined destination, such as a browser, based on the request and template information stored in the data store 113. According to one embodiment, the template information is obtained via a template generation process that allows a user 102 to select various template parameters, such as parameters for controlling an appearance of an iframe and obfuscation parameters for configuring tokenization or encryption processes executed on original data. An exemplary template generation process is further described herein with reference to FIG. 2.

In at least one embodiment, a virtual terminal 118 is an interface rendered on a webpage hosted by the system 101 and accessible to a user 102 and one or more partners 108 or third-parties associated therewith. In various embodiments, an appearance and functions of a virtual terminal 118 are configured based on user data 114 including, but not limited to, templates and template parameters. According to one embodiment, the virtual terminal 118 is accessible via a link and, in some embodiments, authentication of credentials is performed before access is provided to the virtual terminal 118. In various embodiments, a virtual terminal 118 allows a user (or other accessing entity) to select from one or more stored templates, the template parameters of a selected template being used to define an appearance and function of the virtual terminal 118.

In one or more embodiments, user data 114 includes a virtual terminal access list to which a user 102 adds credential information for authorized partners 108 and/or another user 102. According to one embodiment, when a partner 108 or other user 102 accesses the system 101 and requests a virtual terminal 118, the system 101 serves the virtual terminal 118 in a webpage including fields for selecting a template from which the appearance and function of the virtual terminal 118 is configured. In one example, a partner 108 accesses the system 101 and is presented with a virtual terminal including a first field for selecting a user 102 associated with the partner 108. In the same example, upon the partner 108 selecting a particular user 102, the system 101 updates a second field with a list of stored templates associated with the particular user 102 and the partner 108. Continuing the example, the partner 108 selects a template for tokenizing payment processing information and, in response, the system 101 retrieves parameters associated with the selected template and updates the virtual terminal 118 to provide format-preserving tokenization functions and to include fields for receiving a credit card number, a CVV number, and an expiration date. In an alternate example, the partner 108 selects a second template for tokenizing and encrypting health insurance information. In the alternate example, the system 101 updates the virtual terminal 118 to provide format-preserving tokenization and format-preserving encryption functions and to include fields for a patient ID (to be encrypted) and insurance information (to be tokenized).

In various embodiments, the virtual terminal 118 allows for various partners 108 and other third-parties to be provided with access to tokenization, detokenization, encryption, and/or decryption services. According to one embodiment, the system 101 generates login credentials for each entity (e.g., partner 108, other third party, etc.) added to an access list. In at least one embodiment, the system 101 transmits login credentials to each added entity, the login credentials allowing the entity to sign in to the system 101 and access the virtual terminal 118. In one example, a user 102 adds a third-party to an access list, including providing a name, contact info, and privilege level for the third party. In the same example, the system 101 generates and transmits login credentials to the third party that uses the login credentials to access a virtual terminal 118. According to one embodiment, the login credentials include an identifier as described herein (e.g., including one or more of a template ID, a virtual terminal ID, or other identifiers).

In various embodiments, in response to a request from an entity for access to a virtual terminal 118, the system 101 retrieves user data 114 associated with the requesting entity and serves a virtual terminal 118 including fields for selecting a particular template, the fields being populated based on the user data 114. In one or more embodiments, based on parameters of a selected template, the virtual terminal 118 includes one or more fields for receiving original data to be tokenized and/or encrypted, and includes one or more fields for receiving tokens to be detokenized and/or decrypted. In at least one embodiment, tokens or original data are collected from the virtual terminal 118 in response to the accessing entity selecting a command element, such as, for example, a "Tokenize Data" or "Decrypt Tokens" button.

In one example, an entity "Global Airways" is a user 102, and the user 102 is associated with "Hotels International," a partner 108. In the same example, Global Airways offers a credit card to its customers, the credit card providing reward points when used at Hotels International. However, neither Global Airways nor Hotels International wishes to pass customers' sensitive payment processing information through their respective systems. Continuing the same example, to securely process customer transactions and enable tracking of reward points, the user 102 shares a virtual terminal link with Hotels International. In the same example, the link enable Hotels International to access the virtual terminal 118 that was preconfigured by Global Airways via a template generated at the template service 111. In the same example, Hotels International requests and is served the virtual terminal 118 via the link, and the system tokenizes a customer's payment processing information input to the virtual terminal 118. In the same example, the output tokens are temporarily stored in a cache 116 and Hotels International receives a unique identifier associated with the cached tokens. Continuing the example, Hotels International shares the unique identifier with Global Airways, who retrieves and causes the subsequent deletion of the tokens from the cache 116 by transmitting a request to the system 101 including the unique identifier. Continuing the example, the tokens are transmitted to Global Airways, who shares the tokens and identifier with a second partner 108 thereof that processes and authenticates the customers' transaction. Continuing the same example, the second partner 108 transmits a detokenization request including the tokens and identifier and, in response, receives the customer's payment processing information. In the same example, the second partner 108 processes the customer's transaction and, thus, the customer's original sensitive payment processing information never passes through a system or network controlled by Global Airways or Hotels International.

In one or more embodiments, the iframe controller 107 is configured to receive original data and tokens via the rendered iframe elements. For example, the iframe controller 107 receives original data from a browser that renders an iframe within a website 106. According to one embodiment, the iframe service 103 provides received identifiers and original data to the tokenization service 105. In various embodiments, the iframe service 103 is configured to transmit identifiers to one or more of a user 102, a processing partner 108, or a website 106.

In various embodiments, the tokenization service 105 includes one or more tokenization controllers 109. In various embodiments, the tokenization controller 109 may perform actions including, but not limited to: 1) receiving original data and an identifier from one or more of the iframe service 103, users 102, websites 106, and partners 108; 2) encrypting and/or tokenizing original data; 3) decrypting and/or detokenizing tokens to generate original data; and 4) transmitting tokens or original data to one or more of the iframe service 103, users 102, websites 106, and partners 108. In at least one embodiment, the tokenization service 105 may include a set of tokenization controllers 109 configured to perform (de)tokenization and a second set of tokenization controllers 109 configured to perform encryption and decryption.

In some embodiments, the tokenization service 105 restricts the detokenization or decryption of tokens such that only a user 102 that originally requested the tokenization and/or encryption of original data that resulted in the tokens. In one example, the tokenization service 105 only applies detokenization or decryption to a token upon determining that network credentials of a detokenization- or decryption-requesting entity matches recorded network credentials of an entity that requested the generation of the token.

In at least one embodiment, the template service 111 controls creation and management of various templates that are used to determine iframe collection, tokenization, and encryption processes, and to determine appearance and function of virtual terminals 118. In one or more embodiments, the template service 111 is configured to generate and serve (e.g., cause rendering of) various user interfaces that allow a user 102 to interact with the template service 111. In one example, the template service 111 generates and serves a template management interface in which templates associated with a particular user 102 are displayed, as well as selectable options for actions that may be taken with respect to each template. In the same example, the template management interface includes renderings of various template metrics, such as a number of tokenization requests made via the template. In another example, the template service 111 generates and serves a template generation interface that allows a user 102 to create a new template for use in iframe collection and data tokenization (or encryption) processes. According to one embodiment, the template service 111 generates template IDs for identifying stored templates and template parameters in a look-up process. In one example, the template service 111 uses a particular template ID to retrieve a template and/or template parameters from particular user data 114.

Figure 2:
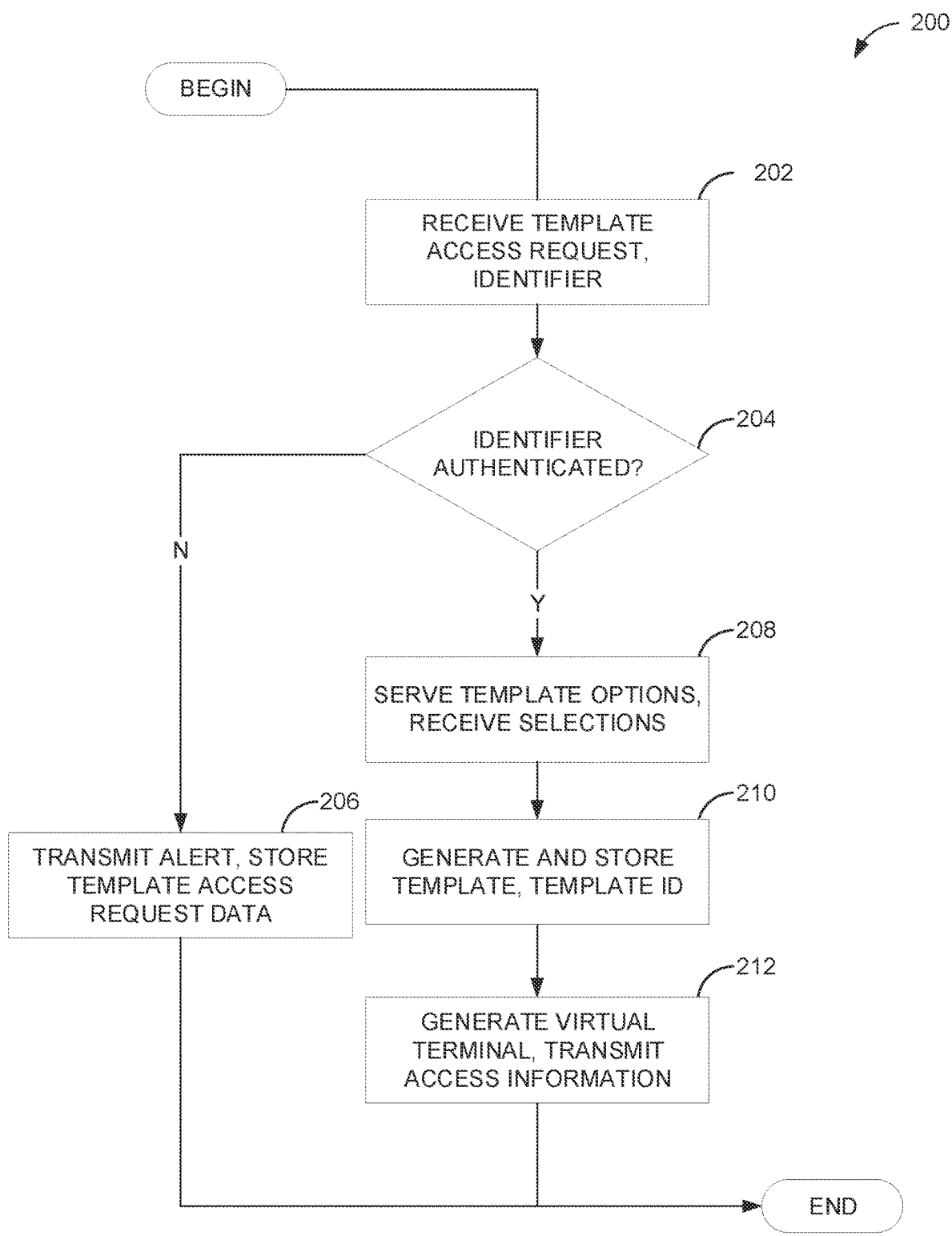
FIG. 2 is a flowchart showing an exemplary template generation process, according to one embodiment.

FIG. 2 is a flowchart showing an exemplary template generation process 200. As will be understood by one having ordinary skill in the art, the steps and processes shown in FIG. 2 (and those of all other flowcharts and sequence diagrams shown and described herein) may operate concurrently and continuously, are generally asynchronous and independent, and are not necessarily performed in the order shown. In various embodiments, the process 200 is performed to configure access, appearance and function of a virtual terminal 118.

At step 202, the system 101 receives a template generation request from a user 102. In some embodiments, the user 102 performs a login process to access the system 101 via an API 112 by providing login credentials that are validated based on user data 114. In one or more embodiments, the template generation request may include an identifier for verifying an identity of the user 102. In at least one embodiment, the user 102 accesses a website hosted by the template service 111 for creating and managing templates and other activities performed by the system 101 on behalf of the user 102. In one example, the user 102 selects a "create template" option from a plurality of selectable options including, but not limited to, "delete template," "add partner," "share template," and other options. In an exemplary scenario, a user 102 desires iframe and tokenization services for their retail website 106 to better insulate their systems from processing sensitive information. The user 102 provides user credentials and/or an identifier at a login page hosted by the template service 111.

At step 204, the template service 111 determines that the user credentials and/or identifier are valid. In at least one embodiment, the template service 111 determines if the user credentials and/or identifier matches stored credentials in user data 114 that are associated with the user 102. In response to determining the credentials are valid, the process 200 proceeds to step 208. In response to determining that the credentials are not valid, the process 200 proceeds to step 206. In at least one embodiment, the validation of user access privileges at step 204 is performed automatically via an API 112 that facilitates communications between the user 102 and template service 111 throughout the process 200.

At step 206, the template service 111 generates and transmits an alert based on the failure to validate the credentials of the user 102. In at least one embodiment, the alert includes the credentials and other information associated with the template request, such as a timestamp, IP address, and other information. According to one embodiment, the alert is transmitted to an administrator of the template service 111 and/or system 101. In various embodiments, the template service 111 performs other actions, such as, for example, adding the credentials to a blacklist used to block entities from accessing the system 101.

At step 208, the template service 111 serves a template management interface to the user 102, for example, in the form of a webpage. In one or more embodiments, the template management interface may include a list of current templates associated with the user 102, as well as various selectable options for executing various actions with respect to each template. In various embodiments, the template management interface includes a "create template" option that is selected by the user 102 (e.g., via a cursor or other input device). According to one embodiment, in response to the selection, the template service 111 serves a template generation interface including a plurality of selectable options for inputting template parameters. In various embodiments, the serving of the template options includes, but is not limited to, displaying (e.g., on a web page, application, user interface, or the like) an electronic form containing one or more fields configured to receive selections for template parameters.

In at least one embodiment, the one or more inputs or selections are received from the user 102 to configure various elements of the template including, but not limited to: 1) a partner 108 associated with the template; 2) a name for the template; 3) an access mode for the template (e.g., whether or not the tokens generated from the template may be detokenized or decrypted by entities other than the original entity that requested tokenization or encryption of data); 4) iframe options for uploading custom files and code to control an appearance and arrangement of iframes rendered by the iframe service 103 based on the template; 5) whether or not partners 108 or other users 102 should be provided with access to a virtual terminal 118 configured from the template; and 6) other elements. In at least one embodiment, the system includes one or more systems, processes, and/or techniques for configuring and customizing iframes as described in U.S. patent application Ser. No. 15/997,205, entitled "SYSTEMS AND METHODS FOR ONLINE PAYMENT PROCESSING USING SECURE IN-LINE FRAMES," filed Jun. 4, 2018, which is incorporated herein by reference in its entirety. In the case of a conflict of terms, the present disclosure governs.

According to one embodiment, the template generation interface includes a selectable element that, upon selection, causes the template service 111 to generate a unique template ID for use in various processes described herein. In alternate embodiments, the unique template ID is automatically generated as described at 210.

In one or more embodiments, the template generation interface includes selectable options for adding template fields, each template field for receiving a particular type of original data. In at least one embodiment, the template fields include various parameters including, but not limited to: 1) field name; 2) data type; 3) format preservation method; 4) transformation method; and 5) other parameters. In at least one embodiment, the template fields include parameters for an interface (e.g., an iframe or virtual terminal 118) in which the template fields will be rendered. According to one embodiment, the parameters include, but are not limited to, field sort order, field label, field input length, placeholder data, and field input type (e.g., selectable input, custom input, or hidden input, in which input values are not rendered in recognizable form). In at least one embodiment, the parameters include an option for enabling validation of iframe inputs based on expected data type. According to one embodiment, the validation is performed using a luhn check algorithm, or the like. In one or more embodiments, the template fields include a parameter for enabling or disabling idempotent token generation. In various embodiments, idempotent token generation refers to a quality of tokenization in which a tokenization controller 109 produces an identical token each time the same set of original data is tokenized.

In various embodiments, data type refers to a type of original data to be received in the field. According to one embodiment, for each data type, the system 101 generates a token. In some embodiments, each token is tagged with a data type identifier that is used to determine the type of data represented by the token. In one or more embodiments, the data type identifier is an alphanumeric or numeric sequence that is associated with a data type in a look-up table. In at least one embodiment, for detokenization and decryption processes, the system 101 performs a look-up process to determine a data type included in each token for which detokenization and/or decryption is requested.

According to one embodiment, the data types include, but are not limited to, address, account number, credit card number, CVV, date of birth, driver's license number, email, expiration date, gender, IP address, location, MAC address, medical ID, mobile ID, name, national ID number, passport number, race, telephone number, tax ID, username, vehicle ID, alpha string, numeric string, alphanumeric string, and other types. In one or more embodiments, the transformation method options include, but are not limited to, encryption, tokenization, format preserving encryption (FPE), and format preserving tokenization (FPE).

In at least one embodiment, the format preservation method options for retaining portions of data received in the template field, the options including, but not limited to: 1) retaining up to four terminating characters of an input plaintext (e.g., from the original data); 2) retaining up to six original characters of an input value; 3) retaining up to six leading characters of the input plaintext; 4) retaining combinations of the up to six leading and four terminating characters of the input; 5) retaining one or more special characters (e.g., that are specified via inputs of the user 102 to the template generation interface). Exemplary format-preservation techniques can be found in Tables 1 and 2.

TABLE 1

Exemplary special characters preserved in a format-preserving tokens.
Special Characters Preserved -
@
_
:
%
/
+
!
(
-
.
space
;
;
:

TABLE 2

Exemplary format preservation techniques.

| Format Preservation Type | Description |
| --- | --- |
| LAST_FOUR_TOKEN | Retains last four original characters of input |
| FIRST_SIX_TOKEN | Retains first six original characters of input |
| FIRST_TWO_LAST_FOUR_TOKEN | Retains first two and last four original characters of input |
| FIRST_SIX_LAST_FOUR_TOKEN | Retains first six and last four original characters of input |
| FIRST_FOUR_LAST_FOUR_TOKEN | Retains first four and last four original characters of input |

In one or more embodiments, partial format preservation techniques applied in tokenization and encryption may allow a user 102 to retain existing internal organization, verification and interface systems, and to maintain, without modification, processes that rely on processing partial segments of data (for example, processes that process the last four values of a social security number). Thus, in various embodiments, partial format preservation in a token may grant necessary anonymity and security, while preserving functionality and organization of existing user systems and processes.

In at least one embodiment, the template service 111 may generate a template preview that is rendered to the user 102 on a display, the template preview being a sample iframe or virtual terminal 118 rendered according to the input and selected template parameters. In one embodiment, the template preview may include a visualization of a tokenization process that illustrates an exemplary scenario of receiving original data and generating tokens from the original data according to selected obfuscation parameters. According to one embodiment, the template preview may provide the user 102 an indication of data and token appearance as would be produced by the system according to the current template parameters. In at least one embodiment, the template generation interface includes an option that, upon selection, transmits a confirmation signal to the system indicating that the acceptance and finalization of current template parameters.

At step 210, the template service 111 generates and stores a template based on parameters selected by the user 102. According to one embodiment, the template is stored in user data 114 associated with the user 102. In at least one embodiment, the template service 111 generates a unique template ID associated with the template. According to one embodiment, one or more subsequent identifiers associated with tokens generated from the template include the template ID (e.g., by concatenation of the identifier with the template ID). In some embodiments, the unique template ID and template are stored in one or more tables to enable retrieval of the template parameters in subsequent processes.

In at least one embodiment, the template ID may be an alphanumeric sequence, a hexadecimal sequence, a base64 sequence and/or an encrypted sequence. In various embodiments, the template ID may encode therein the template parameters specified in the template form. Accordingly, in one or more embodiments, the system, upon parsing the template ID, may acquire information for providing tokenization services to the user. For example, the template ID may be parsed to identify a data type, one or more actions (e.g., tokenization, encryption, etc.) and a format preservation method. In one or more embodiments, the user 102 submits the template ID, or a unique identifier including the template ID, in (de)tokenization, encryption, and decryption requests. According to one embodiment, the inclusion of the template ID in the requests allows the system 101 to configure tokenization, detokenization, encryption, and decryption processes based on preconfigured preferences.

In at least one embodiment, the system 101 transmits the template ID to the user 102. According to one embodiment, the user 102 updates code within their website 106 to include the template ID such that, upon a browser accessing the website 106, the browser calls the iframe service 103 and provides the template ID in a request for serving of iframe elements corresponding to the template ID. In at least one embodiment, based on partner and sharing parameters selected by the user, the template service 111 may transmit a notification to one or more partners 108 associated with the user 102. According to one embodiment, the notification includes one or more of, but is not limited to, a custom message input by the user 102, a link to a webpage hosted by the system 101 for configuring login credentials to a virtual terminal 118 configured from the template, and other information. In one or more embodiments, user data 114 is updated to provide the one or more partners 108 (or other entities) an option for selecting the template for configuration of a virtual terminal 118.

At step 212, the system 101 generates a virtual terminal 118 based on the template parameters. In at least one embodiment, the system 101 generates a unique HTML link that, when provided to a browser, directs to a webpage in which the virtual terminal 118 is rendered. According to one embodiment, the system 101 transmits a link to the virtual terminal 118 to the user 102 and the one or more partners 108. For example, the template service 111 automatically sends an email containing the link to an email address associated with the user 102 and email addresses associated with each of the one or more partners 108.

Figure 3:
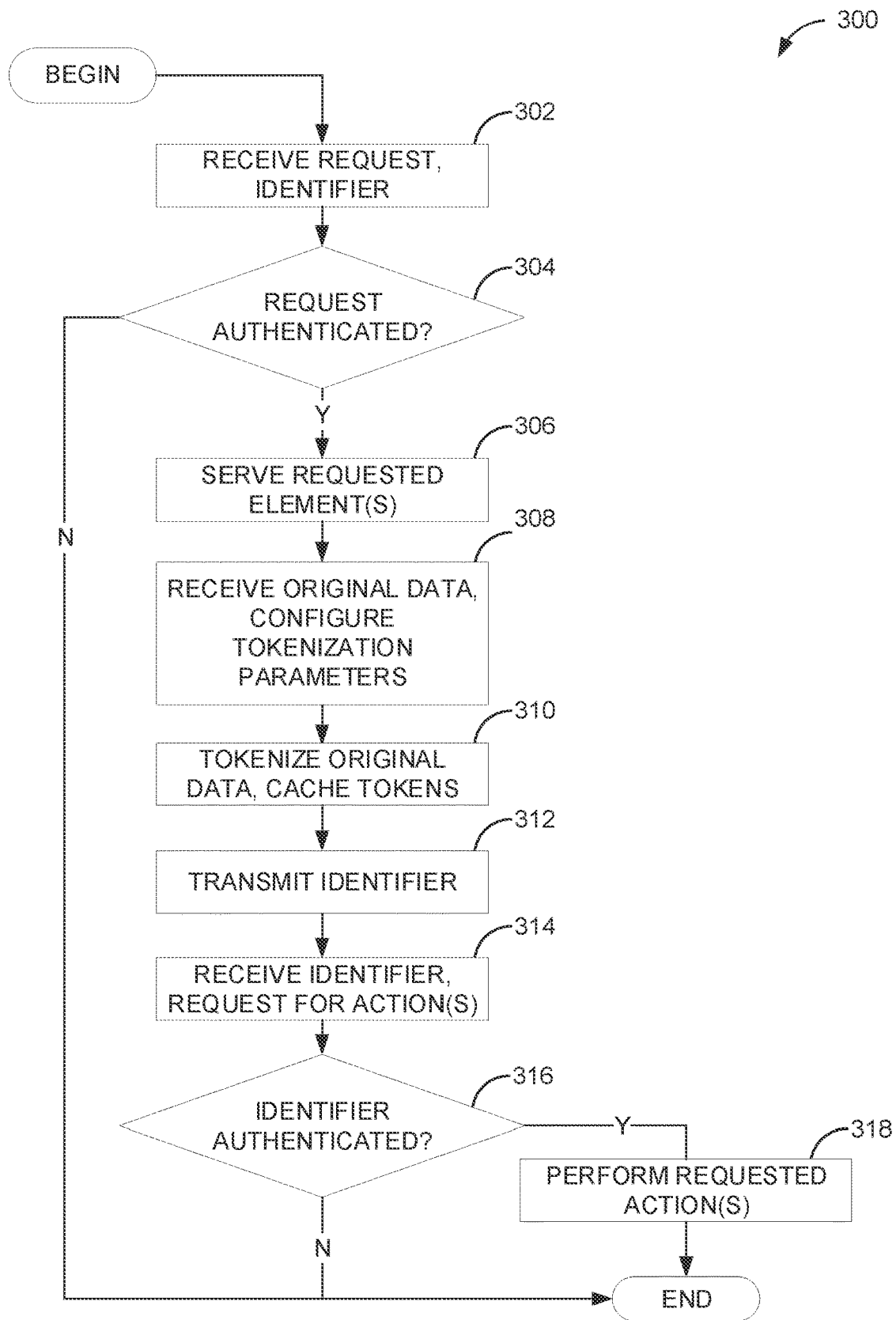
FIG. 3 is a flowchart showing an exemplary data collection and tokenization process, according to one embodiment.

FIG. 3 illustrates a flowchart showing an exemplary data collection and tokenization process 300, according to one embodiment of the present disclosure.

At step 302, the system 101 receives a request from a user 102 or partner 108. In some embodiments, the request is for serving of an iframe or, in other embodiments, for access to a virtual terminal 111. According to one embodiment, the request is automatically received upon access of a website 106 by a subject, such as a customer of the user 102. In one example, a server controlled by a user 102 automatically transmits the request upon serving a website 106 to a subject. In at least one embodiment, the request includes credentials (e.g., MAC address, IP address, etc.) associated with the user 102. According to one embodiment, the request includes a template ID for configuring the serving of iframe elements and the collection and tokenization of original data.

At step 304, the system 101 authenticates the request. According to one embodiment, the system 101 determines if credentials associated with the request match user data 114 associated with the user 102 or a partner 108 thereof. In various embodiments, the credentials are included in the received request. In one or more embodiments, the credentials are automatically collected from the system used by the user 102 (or other requesting entity) to transmit the request. In one example, the system 101 determines that a network address from which the request was received matches a stored network address in user data 114 that corresponds to the user 102 that transmitted the request. In at least one embodiment, if the system 101 determines that the received credentials correspond to user data 114, the system 101 confirms an authentication threshold and proceeds to step 306. In one or more embodiments, upon determining that the credentials do not correspond to user data 114, the process 300 is suspended. In at least one embodiment, the system 101 takes additional actions before suspending the process 300, but not limited to, generating and transmitting alerts, adding the received identifier and/or credentials to a blacklist, and other actions.

At step 306, the system serves one or more requested elements. In at least one embodiment, the requested element is an iframe including one or more iframe elements to a browser providing access to the website 106 associated with the user 102 or partner 108. In some embodiments, the one or more iframe elements are served to a browser that renders the iframe within rendering of the website 106 such the rendered display appears to be a single site. According to one embodiment, the request specifies a particular browser or website 106 to which the one or more iframe elements are served. In at least one embodiment, the one or more iframe elements are served according to template parameters extracted from the template ID. In some embodiments, using the template ID, the system 101 performs a look-up process to retrieve a stored template and parameters from the data store 113. In alternate embodiments, a template ID is not included in the request, but is retrieved from user data 114 based on matching received credentials to particular user data 114. In one example of an alternate embodiment, a template ID is retrieved by matching a received network address to a particular network address in user data 114 that is associated with the template ID.

According to one embodiment, a virtual terminal 118 includes a field for receiving a selection for a particular template. In one or more embodiments, in response to receiving a selection of a particular template, the system 101 updates the virtual terminal to include one or more fields based on parameters associated with the particular template. In one or more embodiments, the system 101 configures tokenization, encryption, detokenization, and/or encryption processes based on the particular template. In at least one embodiment, the virtual terminal 118 shows a plurality of selectable templates based on the credentials of the user 102 or partner 108 or third-party associated therewith. According to one embodiment, the one or more selectable templates are shown based on one or more stored templates associated with the credentials of the user 102, partner 108, or third-party that requested access to the virtual terminal 118. In one example, a partner 108 requests access to a virtual terminal 118 and the system 101 retrieves user data 114 associated with the partner 108. In the same example, the user data 114 includes a set of templates configured by a user 102 with whom the partner 108 is associated (e.g., and the set of templates being determined based on access parameters configured by the user 102 during template creation). Continuing the same example, the virtual terminal 118 shows selectable indicia including names of each of the set of templates are shown in the virtual terminal 118. In the same example, a selection for a particular template is received and the system 101 updates the virtual terminal 118 to include one or more fields based on stored parameters associated with the particular template.

In one example, a subject accesses an airline ticketing website 106 operated by an airline (e.g., user 102) and accesses a transaction page for purchasing a ticket. In the same example, a server that serves the transaction page to the subject also transmits an iframe request to the system 101. Continuing the same example, the transaction page is loaded and the requested iframe is served to website 106, the request iframe being rendered on the transaction page. In the same example, the requested iframe is customized based on template parameters such that the iframe elements therein match an overall appearance and schema of the website 106. Thus, the iframe provides a mechanism for securely processing information for the subject while maintaining the overall look and feel of the website 106. Continuing the example, the iframe elements are configured to receive original data including a credit card number, CVV, and an expiration date from the subject for the purposes of processing the purchase of the ticket.

At step 308, the system 101 receives original data input to the served iframe elements or to fields of a virtual terminal 118. According to one embodiment, the original data is received upon an iframe field receiving a submission selection, the selection causing the iframe service 103 to collect, via a browser, the original data from the various data input fields included in the iframe elements. In one or more embodiments, authentication information received and validated before the received original data is tokenized or encrypted.

In one or more embodiments, tokenization and/or decryption parameters are retrieved based on a template ID used to define the served iframe elements. According to one embodiment, a tokenization service 105 configures a tokenization controller 109 based on the determined parameters. For example, based on retrieved format preservation parameters, the tokenization controller 109 is configured to retain the last four characters of an email address included in the original information. According to one embodiment, determination and configuration of tokenization parameters (or other transformation parameters) is performed upon the system 101 confirming an authentication threshold at step 304.

In one or more embodiments, the extracted parameters include encryption parameters. In some embodiments, the extracted format parameters cause the system to perform only format-preserving tokenization or only format-preserving encryption. In one example, format-preserving tokenization is performed on a first subset of the original data and format-preserving encryption is performed on a second subset of the original data that excludes the first subset. Thus, according to one embodiment, the system 101 advantageously allows for an iframe to simultaneously provide both tokenization and encryption functions for specific data types.

At step 310, the original data is tokenized and/or encrypted according to the template parameters. In one or more embodiments, tokenization may include, but is not limited to, substituting characters and/or other data elements original data with non-sensitive characters. In at least one embodiment, the tokenization controller 109 performs character substitution according to one or more tokenization algorithms. In various embodiments, outputs of tokenization include one or more vaultless tokens.

In at least one embodiment, the tokenization and/or encryption process includes generation of a unique identifier that may be provided to the system 101 to retrieve, delete, detokenize and/or decrypt the one or more tokens. According to one embodiment, the system 101 requires receipt of the unique identifier for performing actions related to the one or more tokens. In one or more embodiments, the one or more tokens are temporarily stored in a cache 116.

At step 312, the unique identifier is transmitted to the user 102, partner 108, or other entity from which the request was received at step 302.

At step 314, the system 101 receives the unique identifier and a request for one or more actions to be performed with respect to the tokens generated at step 310. In one or more embodiments, the request is received from the particular user 102 (or other entity) that transmitted the request at step 302. In some embodiments, the unique identifier and request is received from another user 102, partner 108, or third-party associated with the user 102. According to one embodiment, the requested actions include, but are not limited to, transmission of the cached tokens, deletion of the cached tokens, and other actions.

At step 316, the system 101 authenticates the identifier, for example, by determining if the identifier includes actionable data. According to one embodiment, if the system 101 is able to authenticate the identifier, the process 300 proceeds to step 318. In one or more embodiments, if the system 101 is unable to authenticate the identifier, the process 300 is suspended.

At step 318, the system 101 performs one or more requested actions, such as, for example, transmitting the cached tokens to the user 102 or partner 108 from which the request was received at step 302. According to one embodiment, the one or more tokens are transmitted to a user 102 or partner 108 that is different from the user 102 or partner 108 from which the request was received at step 302.

In one example, an iframe requesting user 102 is a university collecting and tokenizing student health data, and a partner 108 is a medical center that services students associated with the student health data. In the same example, the university receives a unique identifier following tokenization of the student health data, and uses the identifier to request transmission of the output tokens. Continuing the same example, the university shares the identifier and output tokens with the medical center to enable detokenization of the tokens by the same.

At step 318, in response to performing the one or more requested actions and/or following a predetermined time period, the system 101 automatically purges the cache 116. In one example, the system 101 tokenizes payment processing information for a user 102 and stores the tokens in a cache 116. Continuing the same example, following a predetermined time period of 1 hour, the system 101 automatically purges the tokens from the cache 116. In another example, the system 101 receives a deletion request and, upon authenticating an identifier therein, purges the tokens from the cache 116.

Figure 4:
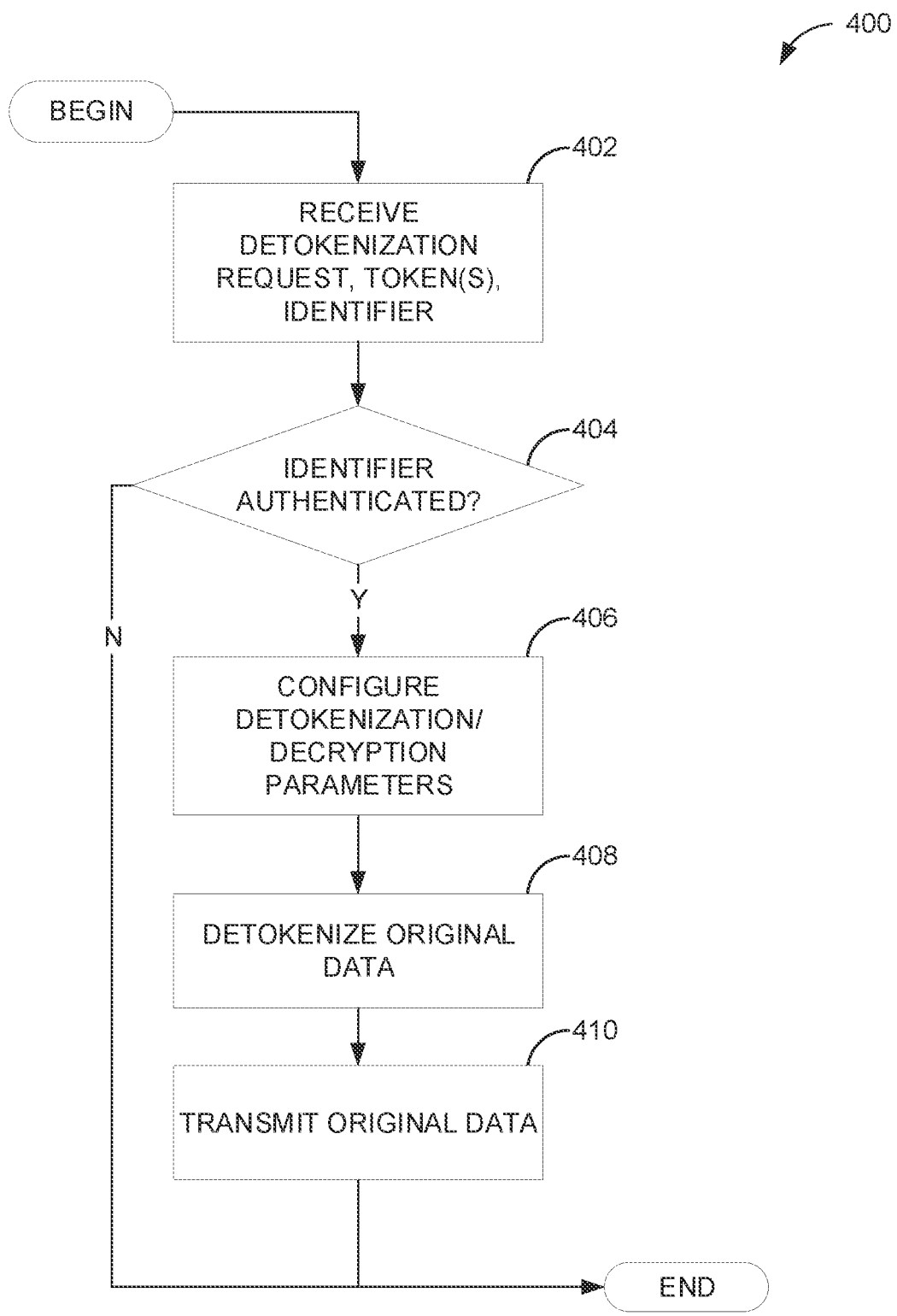
FIG. 4 is a flowchart showing an exemplary detokenization process, according to one embodiment.

FIG. 4 illustrates a flowchart showing an exemplary detokenization process 400. At step 402, the system 101 receives a detokenization and/or decryption request from a user 102 or partner 108. In at least one embodiment, the request includes one or more tokens and an identifier and/or credentials (e.g., MAC address, IP address, etc.) associated with the user 102. According to one embodiment, the identifier includes a template ID for configuring the detokenization and/or decryption of the one or more tokens. According to one embodiment, the request is collected via a virtual terminal 118 or, otherwise, is received directly at the system 101 via the API 112.

At step 404, the system determines if a received identifier is authentic and/or if credentials correspond to user data 114 associated with the user 102 or a partner 108 thereof. In at least one embodiment, if the system determines that the received identifier is authentic and/or the credentials correspond to the user data 114, the system 101 confirms an authentication threshold and proceeds to step 406. According to one embodiment, a template ID is extracted from the identifier and is used to retrieve a template associated with the tokens. In at least one embodiment, the retrieved template specifies that the received tokens are restricted. According to one embodiment, in response to determining the tokens are restricted, the system 101 verifies that the received credentials match credentials associated with the user 102 (or other entity) that requested the original generation of the tokens. In at least one embodiment, the authentication threshold is only confirmed upon the system 101 determining that the credentials of the detokenization-requesting entity match the credentials of the original tokenization-requesting entity.

In one or more embodiments, if the system 101 determines that the identifier is not authentic, and/or if the system determines 101 that the credentials do not match stored credentials, the system suspends the process 400. In at least one embodiment, the system 101 takes additional actions including, but not limited to, generating and transmitting alerts, adding the received identifier and/or credentials to a blacklist, and other actions.

At step 406, detokenization and/or decryption parameters are configured. In one or more embodiments, detokenization parameters are retrieved from the data store 113 based on a template ID extracted from the identifier. According to one embodiment, a tokenization service 105 configures a tokenization controller 109 based on the extracted parameters, which may include detokenization and/or decryption parameters.

At step 408, the one or more tokens are detokenized and/or decrypted according to the extracted parameters. In at least one embodiment, a received token includes a first segment that includes tokenized original data and a second segment that includes encrypted original data. In one or more embodiments, from the token the system 101 extracts a tokenized segment and an encrypted segment and submits each segment to a corresponding detokenization or decryption process.

In one or more embodiments, detokenization may include, but is not limited to, substituting characters of the one or more tokens with algorithmically deduced, original characters. In at least one embodiment, the tokenization controller 109 performs character substitution according to one or more detokenization algorithms. In various embodiments, the tokenization controller 109 decrypt the one or more tokens (in some embodiments, following detokenization). In various embodiments, outputs of detokenization and/or decryption includes original data from which the one or more tokens were generated.

In at least one embodiment, the detokenization and/or decryption process includes generation of a unique identifier that may be provided to the system 101 to detokenize and/or decrypt the one or more tokens. In various embodiments, the unique identifier includes parameters for configuring detokenization and/or decryption of the one or more tokens. According to one embodiment, the system 101 requires receipt of the unique identifier for processing the one or more tokens.

At step 410, original data is transmitted to one or more of the website 106, the user 102, or a partner 108. According to one embodiment, the original data is rendered on a virtual terminal 118 being accessed by the user 102 (or other entity) from which the request was received at step 402. In various embodiments, the unique identifier is transmitted along with the original data, the unique identifier operative for configuring future tokenization and/or encryption processes, as well as template generation processes. According to one embodiment, the original data is transmitted to a user 102 that is different from the user 102 from which the one or more tokens were received. In at least one embodiment, the token-providing user 102 may be a partner 108 of an original data-receiving user 102. In one example, a token-providing user 102 is a social networking company, and an original data-receiving user 102 is a subject in control of a user account provided by the social networking company. Thus, in the example, the system 101 functions as a third party information broker for providing original data to a subject (e.g., that may have previously provided the original data to the social network company that used the system 101 to tokenize the original data).

Figure 5:
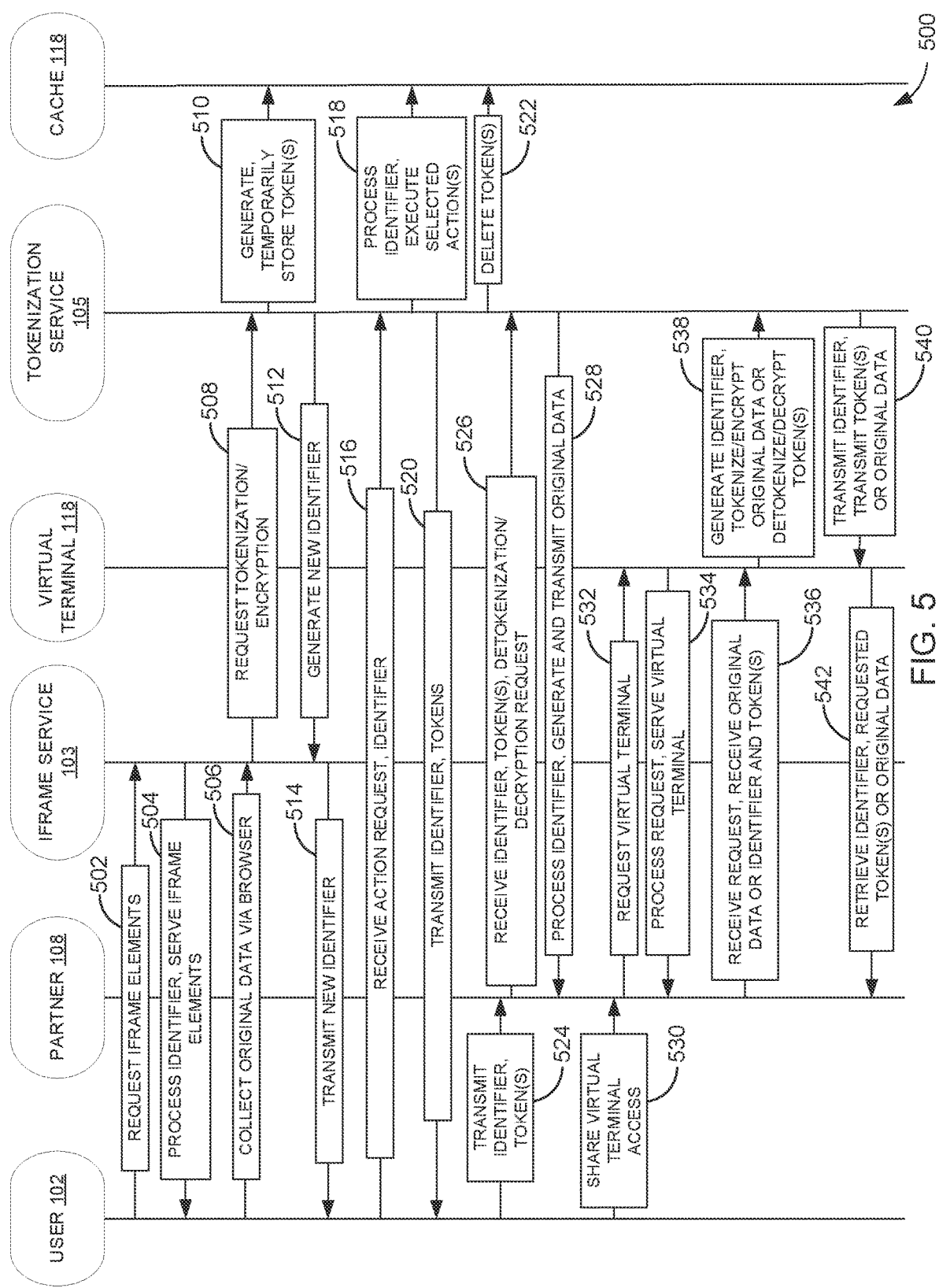
FIG. 5 is a diagram showing exemplary system processes and workflows, according to one embodiment.

FIG. 5 shows a diagram 500 of exemplary workflows and processes performed by the system 101, according to one embodiment.

In at least one embodiment, the steps 502-528 occur in a workflow for collecting original data via an iframe and generating tokens from the original data.

At box 502, the iframe service 103 receives a request from a user 102 (or, in some embodiments, a website 106) for serving of iframe elements.

At box 504, the iframe service 103 processes an identifier in the request and serves iframe elements to the user 102.

At box 506, the iframe service 103 collects original data via the browser hosting the served iframe elements.

At box 508, the iframe service 103 requests tokenization and/or encryption of the original data by the tokenization service 105.

At box 510, the tokenization service 105 performs a tokenization and/or encryption process (e.g., based on stored parameters retrieved by processing the identifier) and generates one or more tokens that are temporarily stored in the cache 116.

At box 512, the tokenization service 105 generates a new identifier associated with the one or more tokens and provides the identifier to the iframe service 103.

At box 514, the iframe service 103 transmits the new identifier to the user 102.

At box 516, the tokenization service 105 receives a request from the user 102 (or, in some embodiments, a partner 108 thereof) for one or more actions, the request including the transmitted identifier.

At box 518, the tokenization service 105 processes the request and identifier and executes the one or more actions, which may include box 520 and/or box 522, among other actions.

At box 520, the tokenization service 105 transmits the stored tokens (and the identifier) to the user 102.

At box 522, the tokenization service 105 causes the deletion of the stored tokens from the cache 118, for example, based on a requested action and/or in response to passage of a predetermined time period (e.g., 1 hour from the time of token generation).

At box 524, the user 102 shares the identifier and the one or more tokens with a partner 108.

At box 526, the partner 108 transmits a request to the tokenization service 105 for detokenization and/or decryption of the one or more tokens, the request including the identifier and the one or more tokens.

At box 528, the tokenization service 105 processes the identifier, detokenizes and/or decrypts the one or more tokens to generate original data, and transmits the original data to the partner 108.

In at least one embodiment, the steps 530-542 occur in a workflow for collecting original data or tokens via a virtual terminal 118 and for generating tokens from original data or for generating tokens from original data.

At box 530, a user 102 shares access with a partner 108 to a virtual terminal 118.

At box 532, the partner 108 transmits a request for a virtual terminal 118, for example, by accessing a particular web address at which the virtual terminal 118 is hosted. According to one embodiment, the request includes a selection of a template to be used for configuring an appearance and function of the virtual terminal 118.

At box 534, the request is processed and the partner 108 is served a virtual terminal 118 configured based on a template stored in the data store 113.

At box 536, the virtual terminal 118 receives a request for tokenization (and/or encryption) of original data input to the virtual terminal 118. In some embodiments, the virtual terminal 118 receives a request for detokenization (and/or decryption) of one or more tokens input to the virtual terminal 118. According to one embodiment, a request for detokenization and/or decryption includes an identifier that is used to authenticate the request. In at least one embodiment, the identifier is an identifier that was previously generated during the generation of the one or more tokens for which detokenization and/or decryption is being requested.

At box 538, the virtual terminal 118 provides the original data to the tokenization service 105. In some embodiments, the virtual terminal 118 provides the one or more tokens (input by the user 102 to the virtual terminal 118) to the tokenization service 105. According to one embodiment, for a detokenization/decryption request, the tokenization service 105 processes the identifier and detokenizes the one or more tokens based on parameters associated with the identifier (e.g., a template ID included therein). In at least one embodiment, for a tokenization request, the tokenization service 105 tokenizes the original data based on obfuscation parameters associated with the virtual terminal 118 (e.g., and further associated with the template from which the virtual terminal 118 was generated). In various embodiments, the tokenization service 105 generates a new identifier associated with the one or more tokens obtained from tokenizing and/or encrypting the original data.

At box 540, the tokenization service 105 provides the detokenized original data to the virtual terminal 118. According to one embodiment, the tokenization service 105 provides the one or more tokens and associated identifier that were generated from the original data to the virtual terminal 118. In one or more embodiments, the detokenized original data or the one or more tokens and identifier are rendered in the virtual terminal 118 as selectable text.

At box 542, the partner 108 retrieves the detokenized (and/or decrypted) original data from the virtual terminal 118, for example, by selecting and copying the values. In one or more embodiments, the partner 108 retrieves the tokenized (and/or encrypted) tokens from the virtual terminal 118 and may share the one or more tokens with the user 102 with which they are associated, with other partners 108, or other third-parties.

ADDITIONAL DESCRIPTION OF VARIOUS EMBODIMENTS

In one or more embodiments, the system 101 may be used for a variety of secured data collection, (de)tokenization, and encryption/decryption purposes. For example, an the system 101 may be used by a care provider to collect sensitive personally identifying patient information, without passing the sensitive personally identifying information through the care provider's sites, servers, etc. In the same example, the care provider may request iframe elements that receive sensitive personally identifying information as original data. The iframe service 103 may collect the original data and a tokenization service 105 may tokenize the sensitive personally identifying information to generate vaultless tokens. The system 101 may transmit the vaultless tokens and an identifier to the care provider, which may retain the vaultless tokens as a substitute for the sensitive personally identifying information. Upon requiring the sensitive personally identifying information, the care provider may detokenize the tokens and obtain the original patient data.

As another example, a government may require that a testing service collect personal information on test takers; however, the testing service may not wish to collect and store personal information. In the same example, the testing service may request the serving of iframe elements that receive personal information from test takers using the testing service's online testing portal. The iframe service 103 may collect the test taker's personal information and a tokenization service 105 may tokenize the personal information into vaultless tokens. The system 101 may provide the tokens and an identifier to the government (e.g., being a partner 108 of the testing service, or vice versa), so that the government may retrieve the personal information, but the testing service may not access the personal information.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed systems and processes may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed systems and processes are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems and processes are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the systems and processes is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems and processes will be readily discernible from the description herein, by those of ordinary skill in the art. Many embodiments and adaptations of the disclosure and claimed systems and processes other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems and processes. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems and processes. In addition, some steps may be carried out simultaneously, contemporaneously, or in synchronization with other steps.

The embodiments were chosen and described in order to explain the principles of the claimed systems and processes and their practical application so as to enable others skilled in the art to utilize the systems and processes and various embodiments and with various modifications as are suited to the particular use contemplated. Alternative embodiments will become apparent to those skilled in the art to which the claimed systems and processes pertain without departing from their spirit and scope. Accordingly, the scope of the claimed systems and processes is defined by the appended claims rather than the foregoing description and the exemplary embodiments described therein.

What is claimed is:

1. A data security system comprising:
an iframe and tokenization system comprising:
an iframe service for producing iframes in communication with a token service;
the token service for creating and detokenizing format preserving vaultless tokens, wherein the iframe and tokenization system is communicatively connected to a partner system and configured to:
receive an iframe request from a browser accessing the partner system, the iframe request comprising a template identifier defining one or more obfuscation parameters for data to be received by an iframe and representing a template to cause rendering of the iframe;
cause the iframe to be rendered according to the template at the browser accessing the partner system;
receive certain data input into the iframe from the browser;
vaultlessly tokenize the certain data as one or more data tokens via the token service according to the one or more obfuscation parameters;
store the one or more data tokens in a cache;
create a token identifier comprising an obfuscated version of the template identifier;
transmit the token identifier to a browser to be passed to the partner system; and
upon receiving the token identifier from the partner system, transmit the one or more data tokens to the partner system, wherein the partner system lacks access to the certain data in the one or more data tokens without the token identifier.

2. The data security system of claim 1, wherein the iframe and tokenization system is further configured to:
receive the one or more data tokens and token identifier;
process the token identifier and extract the template identifier; and
detokenize the one or more data tokens based on the template identifier.

3. The data security system of claim 2, wherein the iframe and tokenization system receives the one or more data tokens and the token identifier from a third-party via an API.

4. The data security system of claim 2, wherein the iframe and tokenization system receives the one or more data tokens and the token identifier from the partner system via an API.

5. The data security system of claim 2, wherein the iframe and tokenization system receives the one or more data tokens and token identifier from the partner system.

6. The data security system of claim 2, wherein the iframe and tokenization system receives the one or more data tokens and token identifier from a third-party system.

7. The data security system of claim 1, wherein the one or more obfuscation parameters comprise format preserving tokenization.

8. The data security system of claim 7, wherein the one or more obfuscation parameters comprise format preserving encryption.

9. The data security system of claim 8, wherein after receiving the certain data input into the iframe, the iframe and tokenization system is configured to:
vaultlessly tokenize a first portion of the certain data as one or more format preserving data tokens via the token service according to the one or more obfuscation parameters; and
encrypt a second portion of the certain data as format preserving encryption via an encryption service operatively connected to the token service according to the one or more obfuscation parameters.

10. The data security system of claim 9, wherein the iframe and tokenization system is configured to:
receive the one or more format preserving data tokens and the token identifier;
process the token identifier to extract the template identifier;
retrieve the one or more obfuscation parameters via the template identifier;
extract the first portion of the certain data by detokenizing the one or more format preserving data tokens based on the one or more obfuscation parameters; and
extract the second portion of the certain data by decrypting the format preserving encryption based on the one or more obfuscation parameters.

11. The data security system of claim 1, wherein the iframe and tokenization system deletes the one or more data tokens from the cache after a predetermined amount of time.

12. The data security system of claim 11, wherein the predetermined amount of time is about one hour.

13. The data security system of claim 1, wherein the certain data comprises a SSN.

14. The data security system of claim 1, wherein the certain data comprises a birthdate.

15. A data security system comprising:
an iframe and tokenization system comprising:
an iframe service for producing iframes in communication with a token service;
a virtual terminal service for producing virtual terminals in communication with the token service; and
the token service for creating and detokenizing format preserving vaultless tokens, wherein the iframe and tokenization system is communicatively connected to one or more third-party systems and configured to:
receive an iframe request from a browser accessing a first third-party system of the one or more third-party systems, the iframe request comprising a template identifier defining one or more obfuscation parameters for data to be received by an iframe and representing a template to cause rendering of the iframe;
cause the iframe to be rendered according to the template at the browser accessing the first third-party system;
receive certain data input into the iframe from the browser;

vaultlessly tokenize the certain data as one or more data tokens via the token service according to the one or more obfuscation parameters;

store the one or more data tokens in a cache;

create a token identifier comprising an obfuscated version of the template identifier;

transmit the token identifier to the browser to be passed to the first third-party system;

upon receiving the token identifier from the first third-party system, transmit the one or more data tokens to the first third-party system, wherein the first third-party system excludes access to the certain data in the one or more data tokens without the token identifier;

provide a virtual terminal to a second third-party of the one or more third-party systems, the virtual terminal based on the template identifier;

receive the one or more data tokens and token identifier via the virtual terminal;

detokenize the one or more data tokens based on the template identifier and token identifier; and provide the certain data to the second third-party system via the virtual terminal.

16. The data security system of claim 15, wherein the iframe and tokenization system is further configured to:

receive the one or more data tokens and token identifier via an API;

process the token identifier and extract the template identifier; and detokenize the one or more data tokens based on the template identifier.

17. The data security system of claim 16, wherein the iframe and tokenization system receives the one or more data tokens and the token identifier from the first third-party via the API.

18. The data security system of claim 16, wherein the iframe and tokenization system receives the one or more data tokens and the token identifier from third third-party of the one or more third-party systems via the API.

19. The data security system of claim 15, wherein the one or more obfuscation parameters comprise format preserving tokenization.

20. The data security system of claim 19, wherein the one or more obfuscation parameters comprise format preserving encryption.

* * * * *